United States Patent
Wakabayashi

(10) Patent No.: US 12,271,344 B2
(45) Date of Patent: Apr. 8, 2025

(54) COMMUNICATION NETWORK, METHOD, NETWORK EQUIPMENT AND COMMUNICATION DEVICE

(71) Applicant: Sony Corporation, Tokyo (JP)

(72) Inventor: Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 614 days.

(21) Appl. No.: 17/268,959

(22) PCT Filed: Sep. 20, 2019

(86) PCT No.: PCT/EP2019/075328
§ 371 (c)(1),
(2) Date: Feb. 17, 2021

(87) PCT Pub. No.: WO2020/064545
PCT Pub. Date: Apr. 2, 2020

(65) Prior Publication Data
US 2021/0224224 A1     Jul. 22, 2021

(30) Foreign Application Priority Data
Sep. 25, 2018   (EP) ..................................... 18196639

(51) Int. Cl.
*G06F 16/00*     (2019.01)
*G06F 16/13*     (2019.01)
(Continued)

(52) U.S. Cl.
CPC .......... *G06F 16/134* (2019.01); *G06F 16/137* (2019.01); *G06Q 20/38215* (2013.01);
(Continued)

(58) Field of Classification Search
CPC ................ G06F 16/134; G06F 16/137; G06Q 20/38215; G06Q 2220/10; H04L 9/0643;
(Continued)

(56) References Cited

U.S. PATENT DOCUMENTS

| | | | |
|---|---|---|---|
| 2009/0030885 | A1 | 1/2009 | Depasquale |
| 2014/0006068 | A1 | 1/2014 | Dawkins |

(Continued)

FOREIGN PATENT DOCUMENTS

| | | |
|---|---|---|
| CN | 101223514 A | 7/2008 |
| CN | 101766011 A | 6/2010 |
| CN | 103155686 A | 6/2013 |
| CN | 106489260 A | 3/2017 |
| CN | 107122838 A | 9/2017 |
| GB | 2372845 A | 9/2002 |
| JP | 2014512750 A | 5/2014 |

(Continued)

OTHER PUBLICATIONS

Frank Khoshnoud, It's Not Hype: Blockchain Could Revolutionize Fleet Management and Mobility Services, retrieved on Sep. 14, 2023, retrieved from the Internet <URL:https://insights.conduent.com/conduent-blog/it-s-not-hype-blockchain-could-revolutionize-fleet-management-and-mobility-services> (Year: 2019).*

(Continued)

*Primary Examiner* — Tyler J Torgrimson
(74) *Attorney, Agent, or Firm* — XSENSUS LLP

(57) ABSTRACT

A communication network for providing a distributed ledger has at least one node configured to provide a distributed ledger function to other nodes.

14 Claims, 18 Drawing Sheets

(51) Int. Cl.
*G06Q 20/38* (2012.01)
*H04L 9/06* (2006.01)
*H04L 9/08* (2006.01)
*H04L 9/40* (2022.01)
*H04L 9/00* (2022.01)

(52) U.S. Cl.
CPC .......... *H04L 9/0643* (2013.01); *H04L 9/0825* (2013.01); *H04L 63/123* (2013.01); *G06Q 2220/10* (2013.01); *H04L 9/50* (2022.05); *H04L 2209/56* (2013.01)

(58) Field of Classification Search
CPC ....... H04L 9/0825; H04L 63/123; H04L 9/50; H04L 2209/56; H04L 63/12
See application file for complete search history.

(56) References Cited

U.S. PATENT DOCUMENTS

| | | | |
|---|---|---|---|
| 2017/0250815 | A1 | 8/2017 | Cuende et al. |
| 2018/0260909 | A1 | 9/2018 | Li |
| 2021/0072033 | A1* | 3/2021 | Husain ............... G06Q 50/30 |
| 2022/0070668 | A1* | 3/2022 | Henot ................ H04L 63/08 |

FOREIGN PATENT DOCUMENTS

| | | |
|---|---|---|
| JP | 2018077642 A | 5/2018 |
| JP | 2018077658 A | 5/2018 |
| WO | WO-2018020377 A1 | 2/2018 |
| WO | 2018/042078 A1 | 3/2018 |

OTHER PUBLICATIONS

IBM, Blockchain for mobility services, retrieved on Sep. 14, 2023, retrieved from the Internet <URL:https://www.ibm.com/downloads/cas/M8AOGADZ> (Year: 2018).*

Quora, What is (sic) difference between a revenue sharing model and a profit sharing model?, 2017, retrieved on Aug. 10, 2024, retrieved from the Internet <URL: https://www.quora.com/What-is-difference-between-a-revenue-sharing-model-and-a-profit-sharing-model> (Year: 2017).*

Boyd Cohen "How Blockchain Technology Will Enable Mobility as a Service", Mar. 12, 2018, pp. 1-5, http://www.barcinno.com/how-blockchain-technology-willenable-mobility-as-a-service/.

Boyd Cohen, "From Mobility as a Service (MaaS) to IoM, (Internet of Mobility)", Feb. 24, 2018, pp. 1-10,https://boydcohen.medium.com/from-mobility-as-a-servicemaas-to-iom-internet-of-mobility-88f5ec3586ac.

Boyd Cohen, "Mobility as a Service (MaaS) and Mobility on Demand (MOD) via Blockchain",Apr. 17, 2018, pp. 1-8, https://boydcohen.medium.com/mobility-as-a-service-maasand-mobility-on-demand-mod-via-blockchain-64e36a2f6676.

International Search Report and Written Opinion mailed on Dec. 12, 2019, received for PCT Application PCT/EP2019/075328, Filed on Sep. 20, 2019, 9 pages.

Crist, "Blockchain and Beyond: Encoding 21 st Century Transport", International Transport Forum, Corporate Partnership Board Report, 2018, pp. 1-61.

ETSI, "Network Functions Virtualisation (NFV); Architectural Framework", GS NFV 002 V1.1.1, Oct. 2013, pp. 1-21.

ETSI, "Mobile Edge Computing (MEC); Framework and Reference Architecture", GS MEC 003 V1.1.1, Mar. 2016, pp. 1-18.

Wikipedia, "Transit Pass", https://en.wikipedia.org/wiki/Transit_pass, Jan. 28, 2021, 7 pages.

What are public, private and hybrid clouds? https://azure.microsoft.com/en-gb/overview/what-are-private-public-hybrid-clouds/.

Castro et al., "Practical Byzantine Fault Tolerance", Appears in the Proceedings of the Third Symposium on Operating Systems Design and Implementation, New Orleans, USA, Feb. 1999, pp. 1-14.

gov.uk, "Distributed Ledger Technology: Beyond Block Chain", https://www.gov.uk/, Jan. 28, 2021, pp. 1-3.

Nikkei BP, "Artificial intelligence & IoT Business, which can be understood as a whole by a single piece of Mucc", Japan, Jan. 28, 2018, pp. 1-4.

* cited by examiner

|  |  | block N | | | block N+1 | | | block N+2 | | | Total |
|---|---|---|---|---|---|---|---|---|---|---|---|
| Pass issuers | #1 | 10 | | 30 | | | | 70 | | | 110 |
| | #2 | | 20 | | 40 | 50 | | | | 90 | 200 |
| | #3 | | | | | | 60 | | 80 | | 140 |
| | | | | | | | | | | | |
| mobility service providers | A | 10 | | | | 50 | 60 | | | | 120 |
| | B | | 20 | | | | | 70 | | 90 | 180 |
| | C | | | 30 | 40 | | | | 80 | | 150 |

# COMMUNICATION NETWORK, METHOD, NETWORK EQUIPMENT AND COMMUNICATION DEVICE

CROSS-REFERENCE TO RELATED APPLICATIONS

The present application is based on PCT filing PCT/EP2019/075328, filed Sep. 20, 2019, which claims the priority to EP 18196639.1, filed Sep. 25, 2018, the entire contents of each are incorporated herein by reference.

TECHNICAL FIELD

The present disclosure generally pertains to a communication network for providing a distributed ledger, a method for providing mobility as a service a network equipment and a communication device.

TECHNICAL BACKGROUND

Generally, it is known to distribute a ledger over multiple nodes such as entities, e.g. electronic devices, servers or the like, which record digital transactions. Distributed ledgers can be based on the known blockchain technology, on which, for example, the known cryptocurrency bitcoin is based, but also the well-known Ethereum project, etc. Generally, a distributed ledger may also be implemented on other technologies than the blockchain technology and examples of distributed ledger projects which are not based on blockchain are BigchainDB and IOTA or the like. For instance, IOTA is a crypto currency which uses linked lists.

Moreover, mobility as a service (MaaS) is known, where a user or passenger uses mobility as a service without owing, for example, a car or the like. Mobility as a service may combine public (e.g. train, bus, etc.) and private (e.g. car sharing, bicycle sharing, etc.) transportation services from associated operators or providers.

Known MaaS solutions typically involve a central and unified gateway through which a trip or journey is planned and booked, wherein a user may pay with a single account.

Although there exist techniques for providing a distributed ledger and mobility as a service, it is generally desirable to provide a communication network for providing a distributed ledger, a method of providing mobility as a service, a network equipment and a communication device.

SUMMARY

According to a first aspect, the disclosure provides a communication network for providing a distributed ledger, comprising at least one node configured to provide a distributed ledger function to other nodes.

According to a second aspect, the disclosure provides a method of providing mobility as a service, comprising maintaining a distributed ledger on multiple nodes, wherein the distributed ledger includes journey data of users using the mobility as a service.

According to a third aspect, the disclosure provides a network equipment comprising circuitry configured to maintain a distributed ledger on multiple nodes, wherein the distributed ledger includes journey data of users using the mobility as a service.

According to a fourth aspect, the disclosure provides a communication device comprising circuitry configured to access a distributed ledger on multiple nodes, wherein the distributed ledger includes journey data of users using the mobility as a service.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
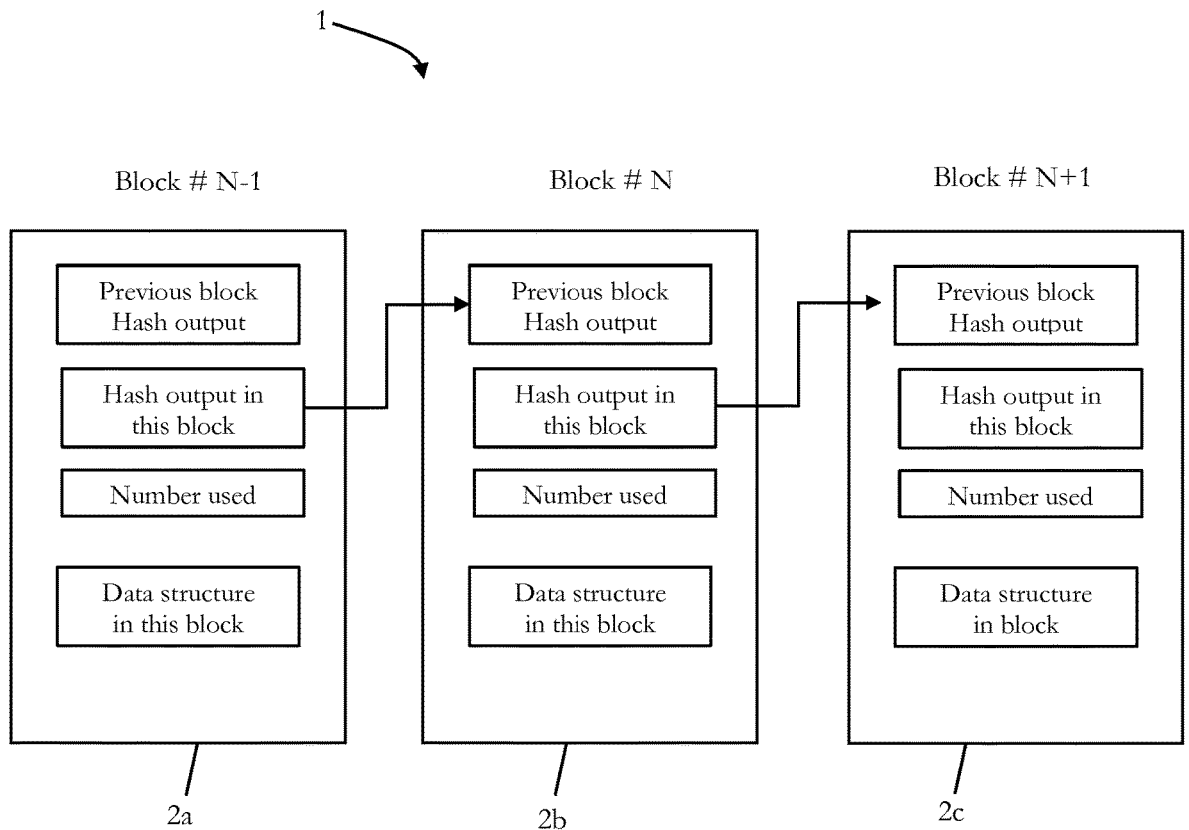
FIG. 1 schematically illustrates a blockchain.

Before a detailed description of the embodiments under reference of FIG. 1 is given, general explanations are made.

As mentioned in the outset, generally, distributed ledgers and mobility as a service (MaaS) are known.

The present disclosure pertains generally in some embodiments or aspects to the application of blockchains/distributed ledger for mobility as a service (MaaS) application, in particular MaaS among more than one service provider (multi-modal transports).

The present disclosure also generally pertains in some embodiments or aspects to the application of a distributed ledger or blockchain as one example for a distributed ledger, without limiting the present disclosure to blockchains. Distributed ledgers or blockchains are recognized to be suitable for Mobility as a service (MaaS) applications according to some aspects of the present disclosure, since a distributed ledger requires a distributed database for journey history (or journey data) among multiplayers, i.e. multiple mobility as a service providers.

Some aspects of the present disclosure pertain to revenue shares for MaaS service providers which may prohibit a data base inconsistency among multi-players.

In some embodiments, MaaS blockchains may require to handle a large number of passengers, store various types of journey records, large size of block, peak of processing at rush hour and so on.

It has been recognized that conventional private blockchains (e.g. for cryptocurrency) may have some limitations. For instance, in the case of a private blockchain, the limited capacity of the number of transactions (e.g. seven transaction per second), limited blocksize (max 2M bytes), long interval of one transaction (every 10 minutes) may render such a conventional private blockchain inconvenient or even not useful for MaaS embodiments.

Hence, some aspects of the present disclosure pertain to the issue which type of blockchains is to be used for MaaS, what kind of data should be stored in a block, what kind of blockchain functions are required, such as adding blocks, consensus protocol, read the data, etc., which may be at least partially different from other blockchain applications, such as cryptocurrency.

In the following, some terminology definitions are given, which may be applied in some embodiments (without limiting the present disclosure to the definitions given in the following. The definitions are only examples which are provided for enhancing the understanding of the present disclosure and which are only given, since the technology fields of MaaS and distributed ledgers are highly dynamical and definitions may change in the future).

The term "distributed ledger" may be known from Wikipedia, which defines: "distributed ledger (also called a shared ledger, or distributed ledger technology, DLT) is a consensus of replicated, shared, and synchronized digital data geographically spread across multiple sites, countries, or institutions. There is no central administrator or centralized data storage."

The technology of a distributed ledger and of a special example of it, namely of a blockchain, will also be discussed further below. More generally, the term distributed ledger is used as a type of database shared digitally recorded data with multiple nodes of a network. It may be comprised of peer to peer network. The digitally recorded data may include a kind of information to prove its consistency from the previously recorded data on the same database.

Distributed ledgers can be public and can be accessible by anyone, but, in principle, they can also be non-public and only users having a permission may have access to them, wherein a group of entities, nodes, persons, operators, providers or the like which have the permission may also referred to as "consortium", as will also be explained further below. It is also possible to differentiate the access permission to data on a ledger from each layered users.

Distributed ledgers can use mechanisms, which are known, for example, from the blockchain technology as used for bitcoin. Such mechanisms include a discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

In a distributed ledger or blockchain, a confirmation process to make a consensus about data renewal on a blockchain in attending nodes, called a mining process, may achieve irreversibility of the sequence of transactions recorded on the blockchain by including previous recorded data in the confirming data. Such mining process implements a distributed timestamp server for a new block of transactions. In bitcoin (and, thus, in some embodiments) the mining process is based on the SHA-256 hash function. Nodes of the blockchain that participate in the mining process search for a hash output with predefined properties while the input of the hash function depends on the current blocks of the blockchain and the new block of transactions to be added to the blockchain.

Proof-of-work computations based on hash functions may not be useful in themselves except that they are required to implement the irreversibility of the distributed ledger.

Moreover, generally, it is known to use a blockchain for storing a variety of data. For instance, images, videos, measurements, and text files can be recorded on the blockchain in the form of a transaction.

The term "Mobility as a service (MaaS)", is also known from Wikipedia, which defines: "Mobility-as-a-Service (MaaS) describes a shift away from personally-owned modes of transportation and towards mobility solutions that are consumed as a service. This is enabled by combining transportation services from public and private transportation providers through a unified gateway that creates and manages the trip, which users can pay for with a single account. Users can pay per trip or a monthly fee for a limited distance. The key concept behind MaaS is to offer travelers mobility solutions based on their travel needs."

A "Public blockchain/distributed ledger" means in some embodiments, that anyone can share the distributed database (ledger) and join to execute the consensus protocol, as also indicated above.

In contrast to that, a "Permissioned blockchain/distributed ledger" means that only permitted members can share the distributed database (ledger) and join to the consensus protocol. Permitted members which have the permission to access the blockchain are called "consortium", as indicated above. In some embodiments, permissioned/consortium type blockchains are suitable for MaaS application, since they are not public and, thus not anyone can access it.

The term "(Mobile) edge computing" can also be find at Wikipedia, which defines: "Multi-access Edge Computing (MEC), formerly Mobile Edge Computing, is a network architecture concept that enables cloud computing capabilities and an IT service environment at the edge of the cellular network[1][2] and, more in general at the edge of any network. The basic idea behind MEC is that by running applications and performing related processing tasks closer to the cellular customer, network congestion is reduced and applications perform better."

The term "Northbound API" is understood in a network virtualization context in the sense that a telecom operator can configure the network function with a software based interface (API) and that the network operator may configure the virtual infrastructure (e.g. virtual machine) and requested network functions/application functions.

The term "Instance" is understood as a software process running on a cloud. It may move somewhere in the distributed cloud.

A "Public cloud" may be defined as (https://azure.microsoft.com/en-gb/overview/what-are-private-public-hybrid-clouds/): "Public clouds are the most common way of deploying cloud computing. The cloud resources (like servers and storage) are owned and operated by a third-party cloud service provider and delivered over the Internet."

In some embodiments, the following terms will be used in the given understanding:

The term "multimodal transport pass" may be a pass which is valid for multi mobility services with specific conditions, such as valid period or available transport, unacceptable services, etc. For instance, a one-day ticket, one-week ticket, monthly MaaS service subscription, seasonal ticket, etc.

The term "mobility service provider" may be a catch-all name of any type of service provider MaaS. In some embodiments, it is typically a transport organization, such as railway companies, bus/coach, tram and taxi, car sharing, ride sharing, bike sharing and so on. Some of the mobility service providers may not provide the actual transport means, but may provide only a booking/arrangement, comparable to a travel agency or online booking site or the like.

The term "Pass" may be a transit pass or travel card (UK) (see also https://en.wikipedia.org/wiki/Transit_pass). In the present disclosure, a multi-modal pass shall also fall under the term "pass", which means that the pass may be valid among more than one transport operator (or mobility service provide) and, thus, it may cover not only public transport, but also cover other types of mobility, such as ride share, bike share, etc. The pass may include the information of acceptable transport, valid period, and any other conditions of ticket issue/transport ride. The MaaS may provide a monthly service subscription with some option of service level in some embodiments. A passenger or user may pay the service subscription fee or purchase of specific period pass to a pass issuer (which may typically be a mobility service provide which issues the pass). The pass may be issued by transport operators or travel agencies, MaaS service provider, etc. (which may all fall under the term mobility service provider as discussed above). Hence, as mentioned, some of the pass issuers may sell a pass, but may not provide the actual transport service or transport means.

The term "Ticket" may be a ticket for a one-way journey of the specific section like one-way train ticket with (or without) seat reservation. The ticket may be issued under the multi-modal transport pass and its terms and conditions in some embodiments and it may include the information of selected transport, seat number, price, etc. In some embodiments, even if no seat reservation is required or unlimited travel is allowed, the ticket may be issued for revenue sharing among multiple mobility service providers. Moreover, a passenger (user) may not directly pay for a ticket issuer, but a pass issuer may pay for the ticket issuer instead of the passenger and the ticket may be issued by a transport operator or service provider, i.e. by a mobility service provider.

The term "Journey log" may cover a journey log which is a one-way journey record based on the ticket. It may include information about the location of embankment, time/day of it, the location of alight, time/day of it, whether the ticket is used or unused, etc., which will also be discussed further below.

In the following a general outline of the description is given, wherein embodiments for four different aspects of the present disclosure will be discussed, which may be implemented or realized as separate aspects or which may be combined with each other in any possible combination.

As a first aspect, a general building block of MaaS functions and blockchains is explained as an example of a distributed ledger. The mobility service provider may has exemplary a key function of MaaS, such as booking, payment, etc. The blockchains are exemplary shared with and among mobility service providers.

As a second aspect, the contents of blocks and chains of blocks of blockchains (or distributed ledger) is explained. A transport service provider (which is a mobility service provide) issues the ticket and records the journey. A block in the blockchain includes each a journey of a passenger among multiple mobility service providers and freeze it (immutable). A mobility service provider can access the record in the distributed ledger, e.g. at a later point of time.

As a third aspect, an architecture or (communication) network/topology is explained. In some embodiments, no centralized server nor centralized organizer is required in the network. A communication network configured as a Peer-to-Peer Mesh network may be used among the mobility service providers. Moreover, a telecom network operator may offer blockchain services or functions and the communication network for it instead of or in addition to mobility service providers.

As a fourth aspect, examples of revenue share calculations with distributed ledgers are discussed. The calculation may be very simple and a mobility service provider may not have to take care of other providers' calculations. The calculated (and correct) amount of revenue may be distributed/transferred among the mobility service providers without a centralized authority (e.g. not via bank).

In the following a blockchain and its general data structure will be explained under reference of FIG. 1. In this embodiment of a blockchain, features are a network/topology, a consensus algorithm a Hash function, participant authentication, a scalability/block structures and performance.

FIG. 1 illustrates a general structure of a blockchain 1. The blockchain 1 includes a chain of multiple data blocks 2a, 2b and 2c, wherein the block 2b is a current block (Block #N), the block 2a is a previous block (Block #N−1) and the block 2c is a future or successor block (Block #N+1). Each block includes a hash function result of a previous block, a main data structure, an input value for hash function and hash function result of the current block, wherein the hash function result of current block (2b) is always used as input to the next block (2c).

Moreover, each block includes a "Number used once", which is a one-shot random number for a secure blockchain processing, and which can prevent replay attack. For instance, if an attacker copies the previous transmitted data and reuses the copied data again for spoofing, the receiver is able to detect the spoofing communication because the next data must be used with a different "number used once". This random number is sometimes referred to as "nonce" in cryptocurrency.

Additionally, the time stamp may be inserted in each of the blocks 2a, 2b and 2c. The blockchain 1 is an example of a distributed ledger, which may be used, for example, for providing MaaS in some embodiments.

Figure 2:
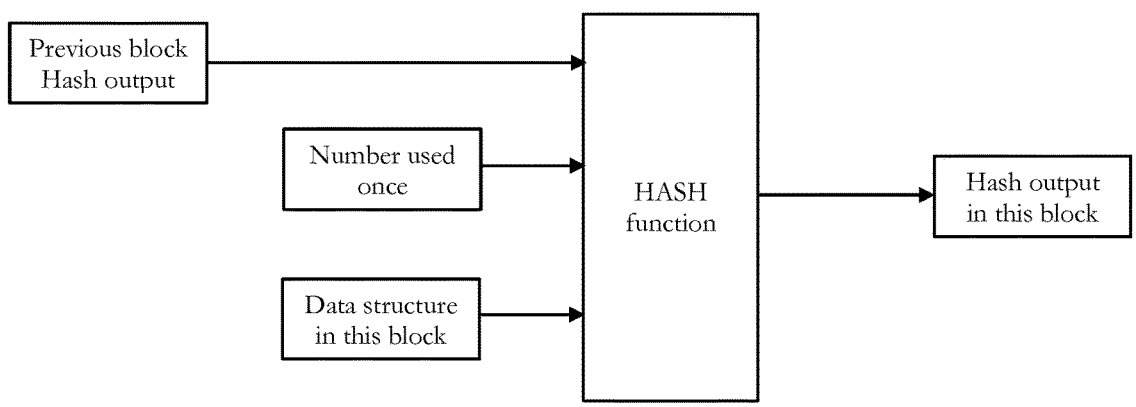
FIG. 2 schematically illustrates hashing in a blockchain.

FIG. 2 illustrates the input and output of a hash function, which is used, for example, for the blockchain 1 of FIG. 1.

Generally, a hash function is any function that can be used to map input data to output data with a specific algorithm. The size of input data can be large and various, contrarily the output of data could be compact and can have a fixed size. A known (and famous) algorithm which is used for hashing in some blockchain embodiments is the Secure Hash Algorithm (SHA) designed by the United States National Security Agency (e.g. SHA-2, SHA-256).

The input for the hash function are a previous hash output, the number used once and the main body of data in the current block (e.g. block 2b in FIG. 1). The output of the hash function is a unique value response to the input values. If someone tries to tamper the main body of data, the output of hash function cannot be consistent.

Embodiments of a distributed ledger (blockchain) in this disclosure may implement a consensus protocol or algorithm. For instance, in some embodiments, the Byzantine Fault Tolerance (BFT) is used for the consensus protocol, which is resilient to spoofing of database and fault of hardware.

A well-known consensus algorithm, which is implemented in some embodiment, is the so-called Practical Byzantine Fault Tolerance (PBFT).

In some embodiments, a permission blockchain is used and the relatively small number of permissioned blockchain nodes are in charge of consensus (validation of block).

Figure 3:
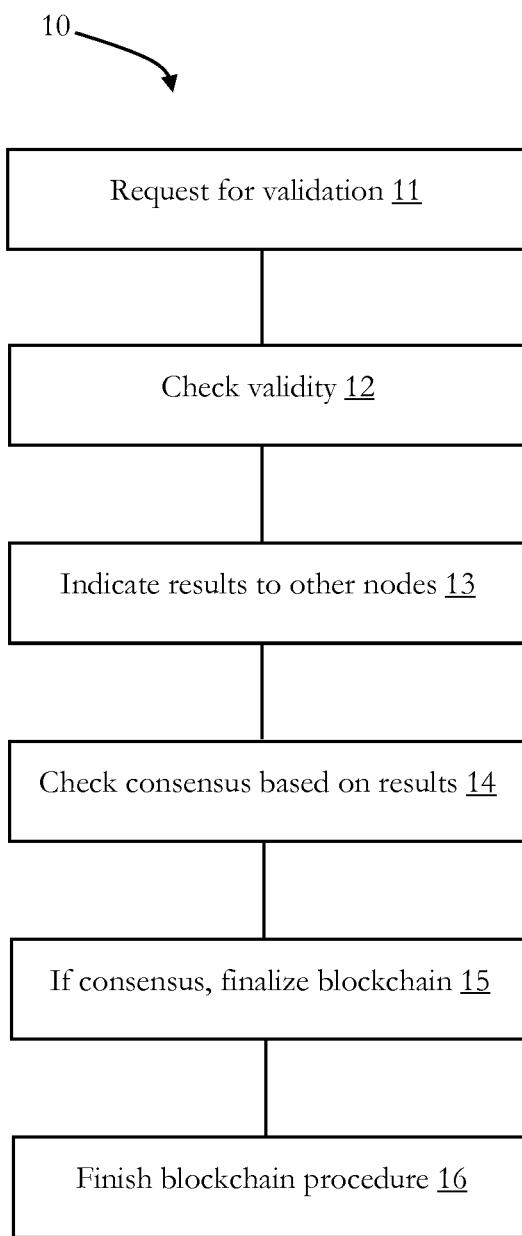
FIG. 3 is a flowchart illustrating an embodiment of a consensus protocol.

FIG. 3 exemplary illustrates the process 10 of PBFT.

A leader node (it also called non-validating peer) requests at 11 other nodes to validate the blockchain. At 12, each requested node (validate peer) checks the validity of the blockchain with a hash function and indicates its result to other nodes at 13. At 14, a node receives the validity results from multiple other peers and checks the consensus of the blockchain, if it receives more valid results than a pre-defined criteria. If there is a consensus, at 15, the node writes/finalizes the blockchain. A leader peer checks the overall progress of the validity check in other nodes and finishes at 16 the blockchain procedure.

For resilience, the total number of nodes is more than 3f+1 in some embodiments, wherein f is the number of allowed failure nodes. For example, f=1, there is a total 4 nodes; if f=3, there is a total of 10 nodes, etc.

In some embodiments, the PBFT is with permission blockchains for mobility service blockchains, as discussed herein, providing at least partially the following features:

With respect to security, the PBFT provides in some embodiments a little risk of 51% attack, which is common for cryptocurrency because permission the peer which is in charge of consensus must be trusted. With respect to privacy, the end user cannot access the whole blockchain because only mobility service providers handle it at a (peer) node (due to the permission based blockchain and end users may not have the permission to access the blockchain). With respect to performance, the processing time for consensus is very short in some embodiments due to a small number of peers having a high performance. With respect to flexibility, the block size and format of blockchains can be flexible compared to public blockchains in some embodiments.

Figure 4:
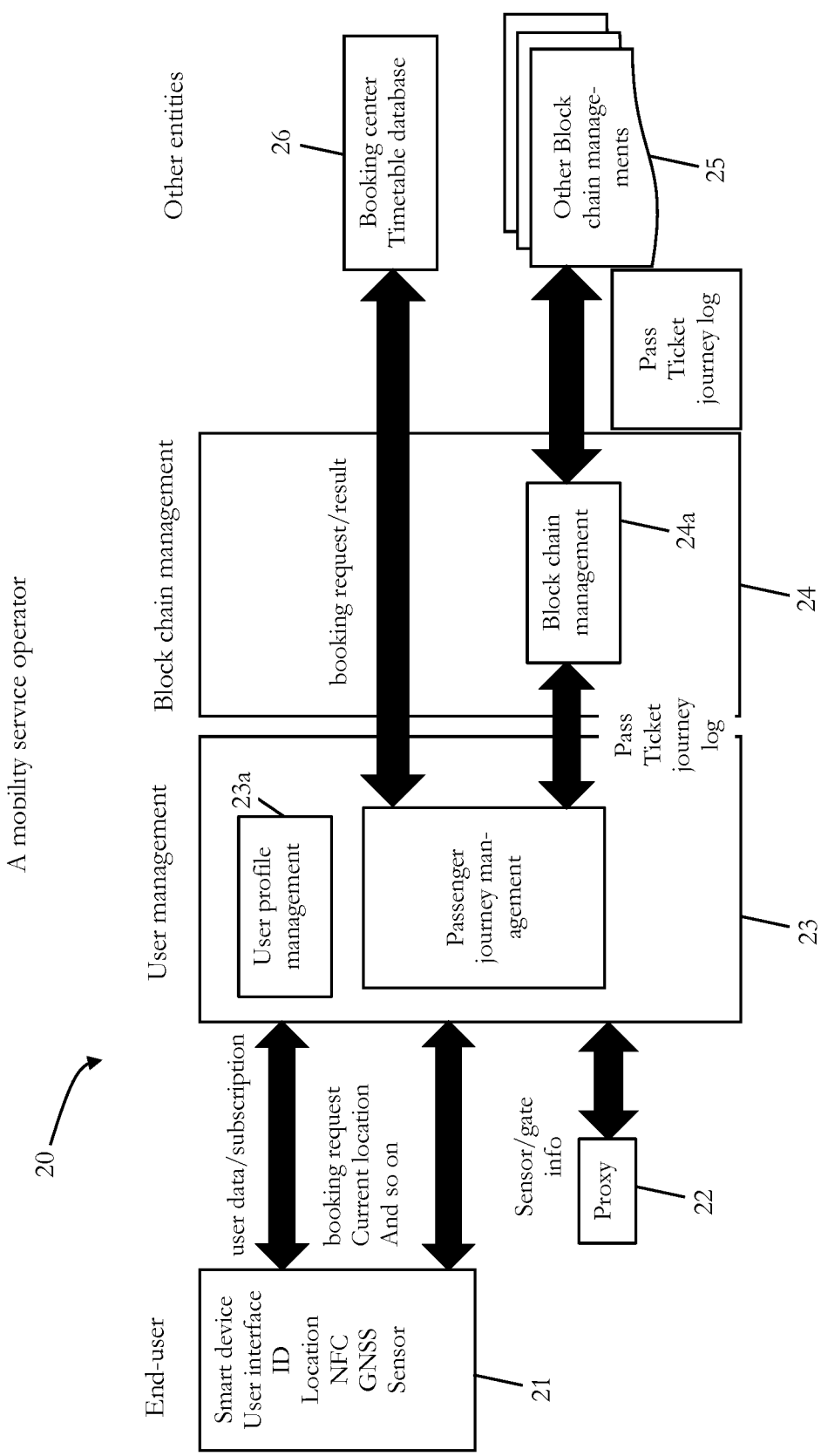
FIG. 4 illustrates a data flow in a MaaS system.

In the following, the data flow of a MaaS system 20 is explained under reference of FIG. 4, illustrating the overall data flow. In the MaaS system 20 it is exemplary assumed that the end-user has an own terminal 21, e.g. a smart phone (or any other type of electronic (mobile) device). Some users (e.g. visitor from oversea) may not have a smartphone or the like, and in such cases, for example, an alternative solution may be provided, which is based on a proxy function (proxy 22) in FIG. 4, which provides a gate to the user.

FIG. 4 illustrates the data flow diagram of the MaaS system 20, wherein three main sections are provided, an end-user section on the left side, a mobility service operator/provider section in the middle and an other entities section on the right side, wherein the end-user section and the other entities section communication with the mobility service provide section in the middle.

For this embodiment of the MaaS system 20 it is assumed that the mobility service provider has a user management function 23 with a web server or cloud for customer services and a user profile management function 23a and a passenger journey management function 23b. It further has a blockchain management function 24. The blockchain function 24 having the block chain management function 24a communicates with blockchain management functions 25 of other entities section. If a seat reservation/shared ride booking is provided by a booking center 26, a central booking server/cloud is provided.

The end user communicates with its own terminal, i.e. smart phone 21 in this embodiment, which has exemplary a user interface and sensors, e.g. GNSS, NFC, etc.

As can also be taken from FIG. 4, the end user can perform, for example, the following actions with the terminal or via the proxy 22: Subscription of services/purchase of one day/one week ticket; booking of train, reservation of car/ride share; transport embark/alight permission/record; post processing after alight (e.g. customer survey, refund or compensation of delay), etc.

The user profile management function 23a is configured to store static data, e.g. name, age, contact address, payment method (e.g. credit card), service subscription status, the preference of transport, any other unique ID like TMEI, etc. and communicates with the terminal 21.

The passenger journey management function 23b is configured to perform several actions and to communicate with the terminal 21. For instance, with respect to a multimodal transport pass it manages, for example, a subscription of MaaS monthly service and a purchase of one-day ticket, one-week ticket, etc. With respect to a journey planning (or journey planner), it provides destination input, route selection/transport options, booking/travel arrangement and issues the ticket and issues the ticket ID, generates itinerary for the passenger and issues the itinerary ID etc. On the journey of a passenger/user, the passenger journey management function is configured to start the journey and, for each section of the journey (iteration), to check the pass/ticket hold and record the embankment, record the alight and add the journey log to the blockchain, and at the end of journey to terminate it and to close the itinerary.

The blockchain management function 24a communicates with the passenger journey management function 23b and the other block managements 25. It is configured to add, to validate/execute consensus protocol and to read the blockchains. Moreover, as can also be taken from FIG. 4, the pass, ticket and journey log information is communicated at least between the passenger journey management function 23b and the block chain management function 24a and between the block chain management function 24a and the other blockchain managements 25.

In the following, an embodiment of a blockchain 30 including a passenger journey history is explained under reference of FIG. 5.

Figure 5:
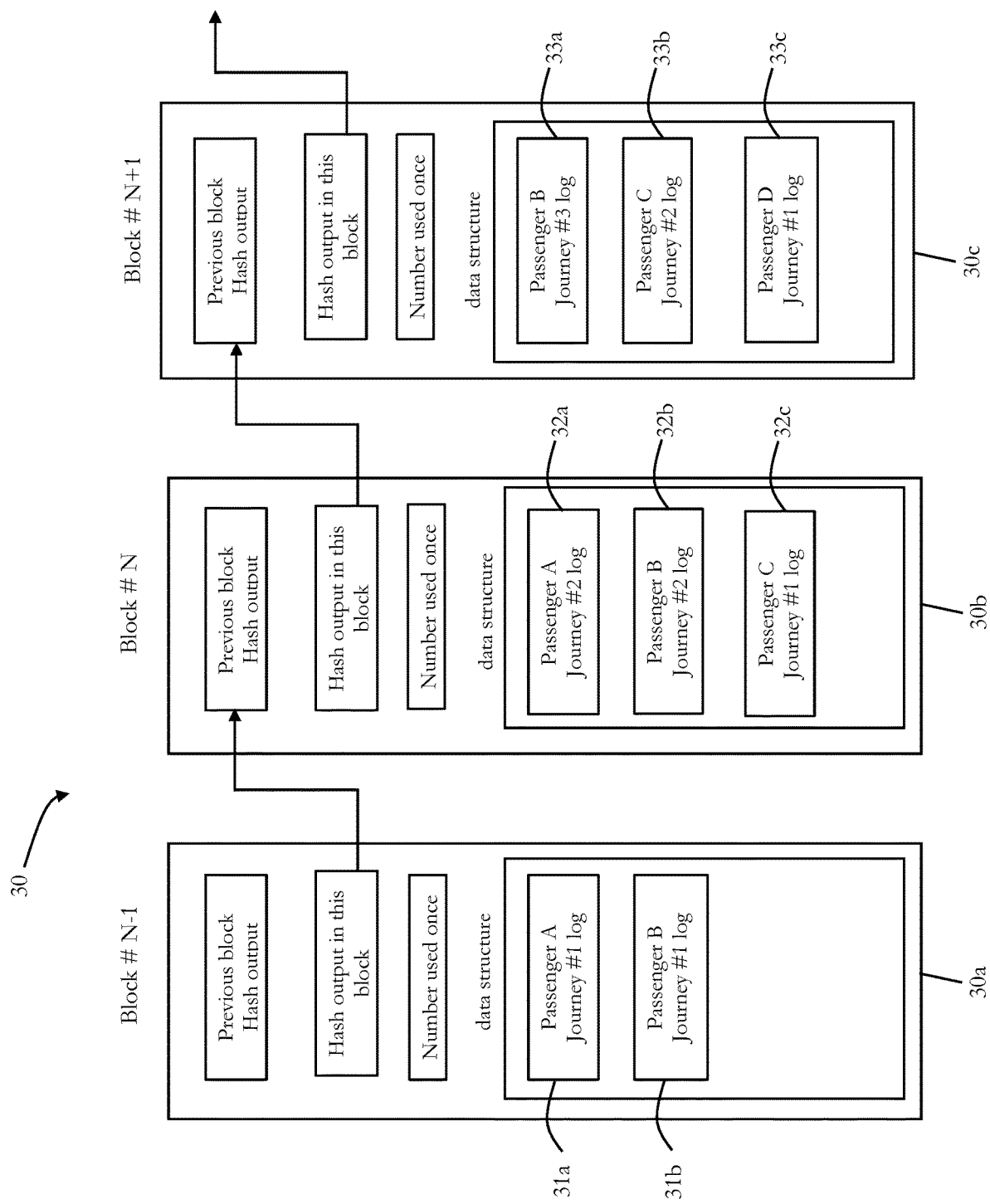
FIG. 5 illustrates an embodiment of a blockchain including journey log data.

The blockchain 30, as also generally explained under reference of FIG. 1, has several blocks 30a, 30b, 30c, wherein in FIG. 5 a past block 30a (Block #N−1), a current block 30b (Block #N) and a successor or next/future block 30c (Block #N+1) are exemplary illustrated.

Each of the blocks 30a, 30b and 30c can include one or more passenger logs in a transaction within a maximum given block size and within an associated data structure. In FIG. 5, the block 30a on the left hand side (Block #N-1) handles two passenger logs 31a and 31b. The hash output from the N-1 block 30a is provided to the next N block 30b (current block). The block 30b (Block #N) handles the next journey logs 32a and 32b of passengers A and B, and, additionally, a journey log 32c of a passenger's C journey. If, for example, a passenger D issues a new journey log, but if simultaneously the block size limit is exceed, the further journey log will be handled in the next block, i.e. in block 30c in the present example, which includes a further journey log 33a entry for passenger B, a further journey log entry 3cb of passenger C and a further journey log 33c entry for passenger D, such that the block 30c (Block N+1) handles the next journeys of passenger C and D and the remaining log of passenger D. Then, the hash output (N+1) is provided to the next block (N+2) (not shown in FIG. 5).

Generally, a journey log in the blockchain 30 may include at least one of the following information:

Issuers: multimodal transport pass issuer, mobility service provider/transport operator, passenger id (anonymized data).

Ticket info: Type of ticket, Type of transport (railway, rideshare and so on), Seat reservation (train/seat number), Price or ticket, Terms and conditions.

Boarding record: The location of embankment, time/day of it, the location of alight, time/day of it, Unused/used.

Remarks: Special notes (e.g. cancelled, delayed).

As mentioned, some embodiments pertain to the node topology and (communication) network providing the distributed ledger or blockchain, wherein in some embodiments the communication network provides a good resilience, performance and low costs.

Generally, it is known to and suggested (e.g. in "Blockchain and Beyond: Encoding 21st Century Transport", retrievable under https://www.itf-oecd.org/sites/default/files/docs/blockchain-and-beyond-encoding-21st-century-transport.pdf), to a have a general structure of distributed network/ledger according to which multiple nodes are interconnected to each other, such as it is the case for the internet, wherein the philosophy is open exchange, distributed deployment and connect to one another, and it is exemplary proposed to have public blockchains on the internet.

However, it has been recognized that such public blockchains, which may even be provided in the internet or a comparable (public) network, may not be ideal in some embodiments, for example for at least one of the following reasons: The node does not directly link to another node. There are many hops in Internet (which may be used, e.g. for an attack, etc.), the processing power of a node may be lower than expectation; nodes may be untrusted, anyone can join public blockchains for consensus, etc.

As also mentioned above, generally, there are various types of blockchains known, and for cryptocurrency public blockchains are suggested.

However, in public blockchains, an end-user can freely add/read block and anyone join the validation of transaction (Proof of Work). In a public chain, the organizer does not have to prepare own infrastructure for blockchains because someone in the Internet would like to join the Proof of Work with their hardware for gaining mining reward.

But, there might be an attack risk of 51% that someone takes over the validation of transaction process. In order to provide the secure transaction in public blockchains, there are many constrains like limited maximum block size, the long processing time of transaction validation and less flexibility of block definition. These restrictions can be acceptable for an infrequent finance transaction like cryptocurrency exchange, but it may not be suitable in some embodiments for daily use of frequent transactions.

Therefore, in some embodiments, the blockchain for MaaS is assumed to use permissioned blockchains. In permissioned blockchains, only permitted operators (forming a consortium) can add/read block and limited participants are allowed to join the validation of transaction (i.e. consensus with trusted players). Hence, in some embodiments, for example, the mobility service providers are organized in a consortium and only those having the according permission are allowed to access the permissioned distributed ledger or blockchain, while malicious participants or dishonest ones cannot join the consortium of blockchain.

In the following, an embodiment of a communication network 40 for providing a (permissioned) blockchain for MaaS is explained under reference of FIG. 6.

In terms of resilience, the communication network 40 mitigates the risk of single point of failure (SPOF), which is typically the weak point of systems, e.g. for conventional systems which are heavily relying on the central of server could be SPOF in the system.

Figure 6:
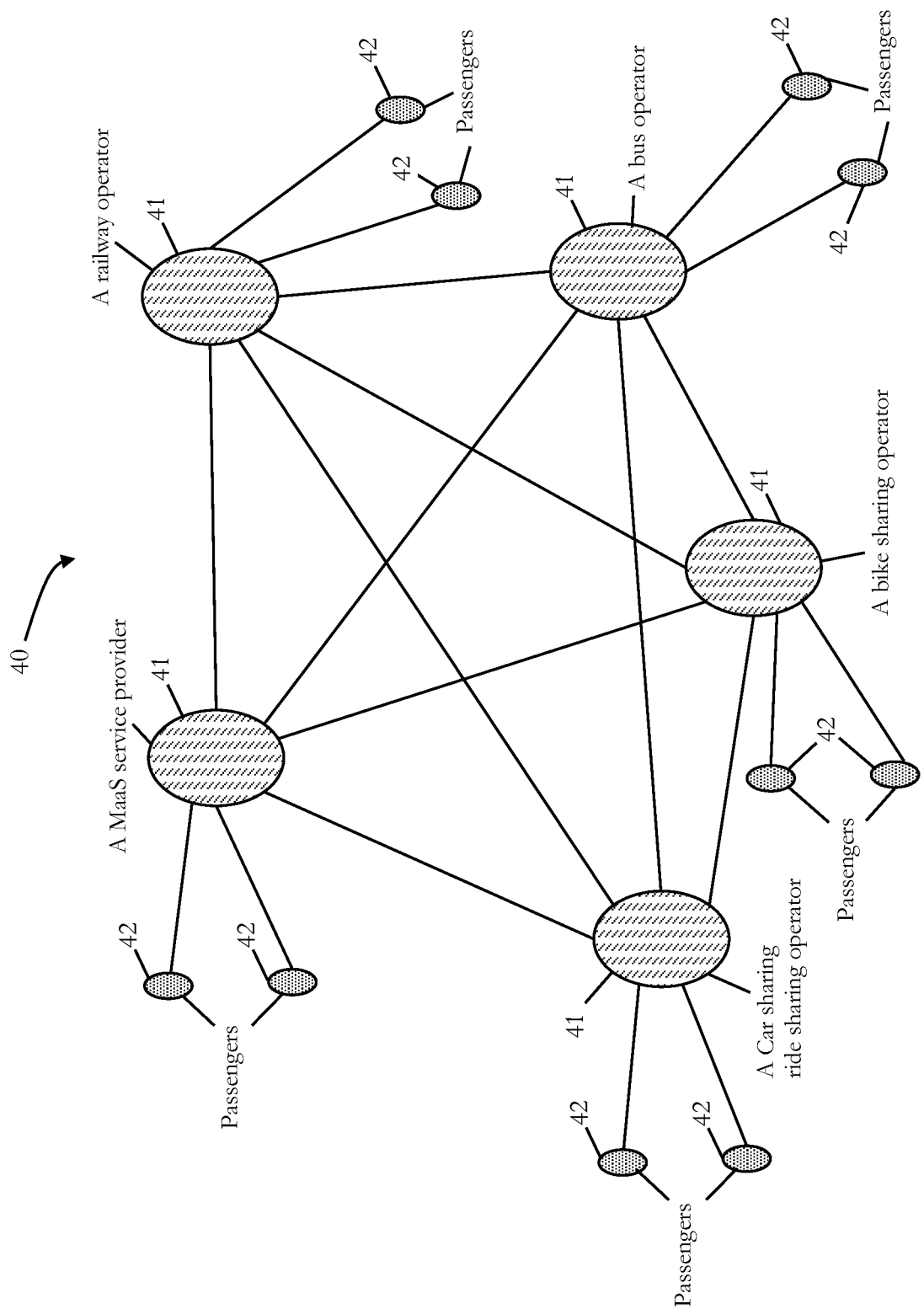
FIG. 6 illustrates an embodiment of a communication network for providing a blockchain.

As can be taken from FIG. 6, the communication network 40 has multiple nodes (or entities) 41 (large circles), which are associated with different operators or mobility service providers, such as a MaaS service provider, railway operator, a car sharing/ride sharing operator, a bike sharing operation and a bus operator.

Moreover, there are multiple passengers 42 (small circles) which can communicate with the nodes 41 of the mobility service providers. The mobility service provider nodes 41 may form together a communication network 40, which provides the permissioned blockchain for MaaS (e.g. blockchain 30 of FIG. 5).

A passenger 42 subscribes, for example, the monthly MaaS service provided by mobility service provider or buy one-day/one-week pass for multi-modal transport services by communicating with its terminal (e.g. terminal 21 of FIG. 4) with the associated mobility service provider.

The mobility service provider 41 could be a new service provider, such as MaaS operator (e.g. shared ride), bike sharing service provider, travel agency in addition to conventional transport operators such as car railway companies, tram operator, as mentioned.

The mobility service providers 41 connect to one another over the communication network, which is a logical connection, wherein a direct connection among operators or mobility service providers is not necessarily required, but it may require low latency and high throughput.

The entity or node 41 of a mobility service provider may have various functions, but there are two main functions, as also discussed above for FIG. 4, namely a passenger management function and the blockchain management function. The passenger management function supports booking of seat, booking of shared ride/taxi/car rental/seat reservation of train, monthly subscription or buying one-day ticket and so on Like a normal e-commerce site, it provides a user interface of website or smart phone back-end processing.

On the other hand, the blockchain is hidden for the end-user in the present embodiment, but it is accessed with and by multiple mobility service providers. Additionally, in the present embodiment, a consortium (permissioned) blockchain is implemented among nodes 41, which validates the blockchain ledger among the mobility service providers which are members of the consortium.

In some embodiments, the blockchain functionality is provided based on edge computing, which is explained in more detail in the following.

In 5G, telecom network operators may offer a network service function (or network application function) on the telco cloud. In addition to the basic network functions, telecom operators are able to provide add-valued functions on the basis of a customer's request.

In some embodiments, a telecom network operator may offer blockchain related services (not limited to MaaS) on behalf of mobility service providers. This means in some embodiments that the blockchain function could be separated from the mobility service provider and operated by one or more telecom operators.

Figure 7:
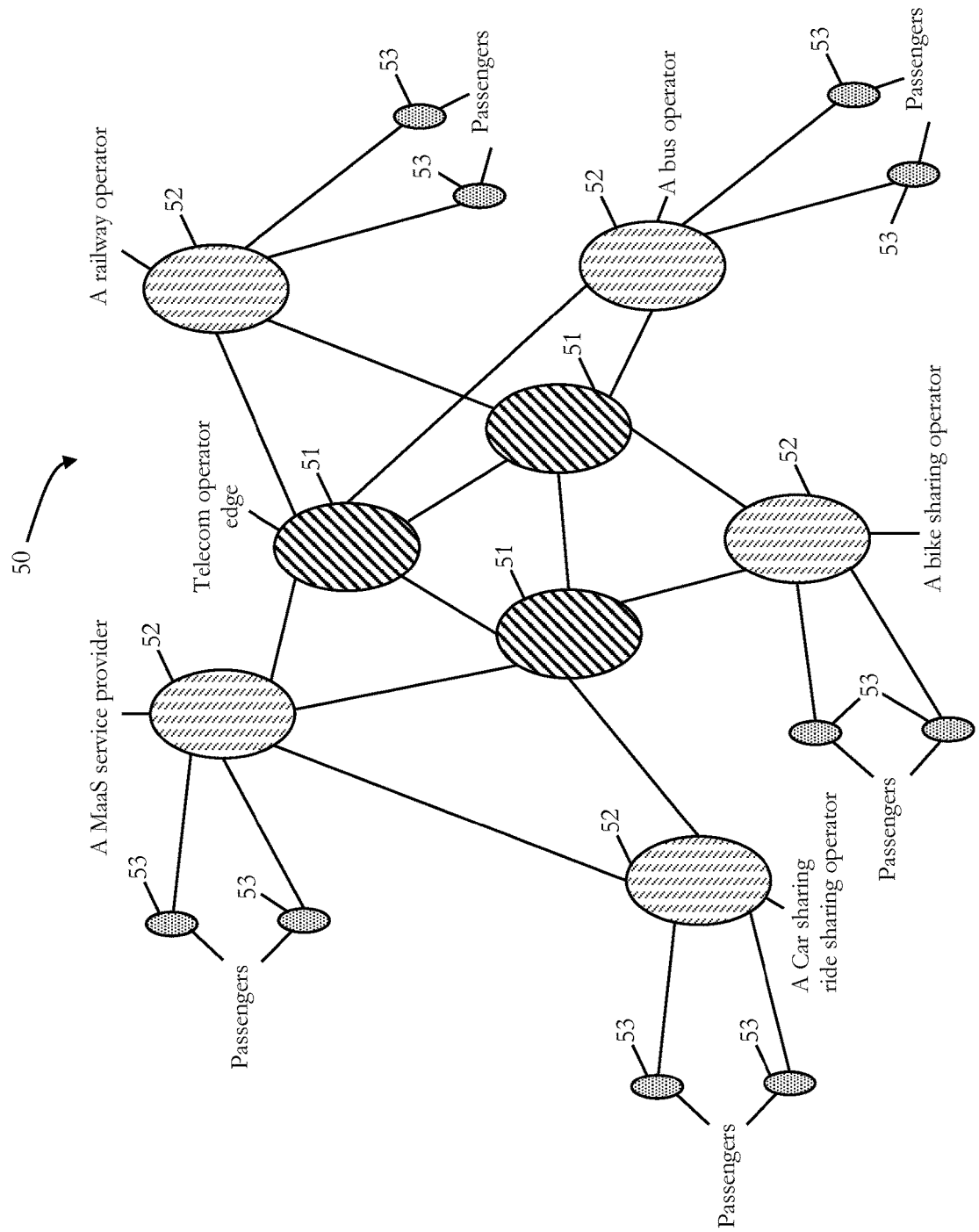
FIG. 7 illustrates an embodiment of a communication network for providing a blockchain based on edge nodes.

FIG. 7 illustrates an embodiment of edge node blockchain processing for a communication network 50.

The communication network 50 includes three edge nodes 51 of telecom operator's own network which provides the blockchain (e.g. for MaaS). A telecom operator can configure the (mobile) edge nodes 51 for blockchain functions with northbound API, as will also be discussed further below.

As already explained for FIG. 6 above, the communication network 50 also has several nodes 52 associated with different mobility service providers, which can be accessed by passengers 53 (as discussed above).

A mobility service provider requests blockchain processing from a node 52 to an edge node 51 of the telecom operator over a predefined API (application interface). On behalf of the mobility service provider, the edge nodes 51 process the blockchain related functions (add/read/consensus) and communicate it to other nodes 52. The link between the edge nodes 51 support high speed/low latency communication, which is helpful for fast blockchain processing and large block size handling in some embodiments.

The edge nodes 51 (or also nodes 52) may be based on a virtualized network, e.g. based on network virtualized functions as provided by the ETSI NFV specification (ETSI GS NFV 002, V1.1.1 (2013 October), Network Functions Virtualization (NFV); Architectural Framework).

Figure 8:
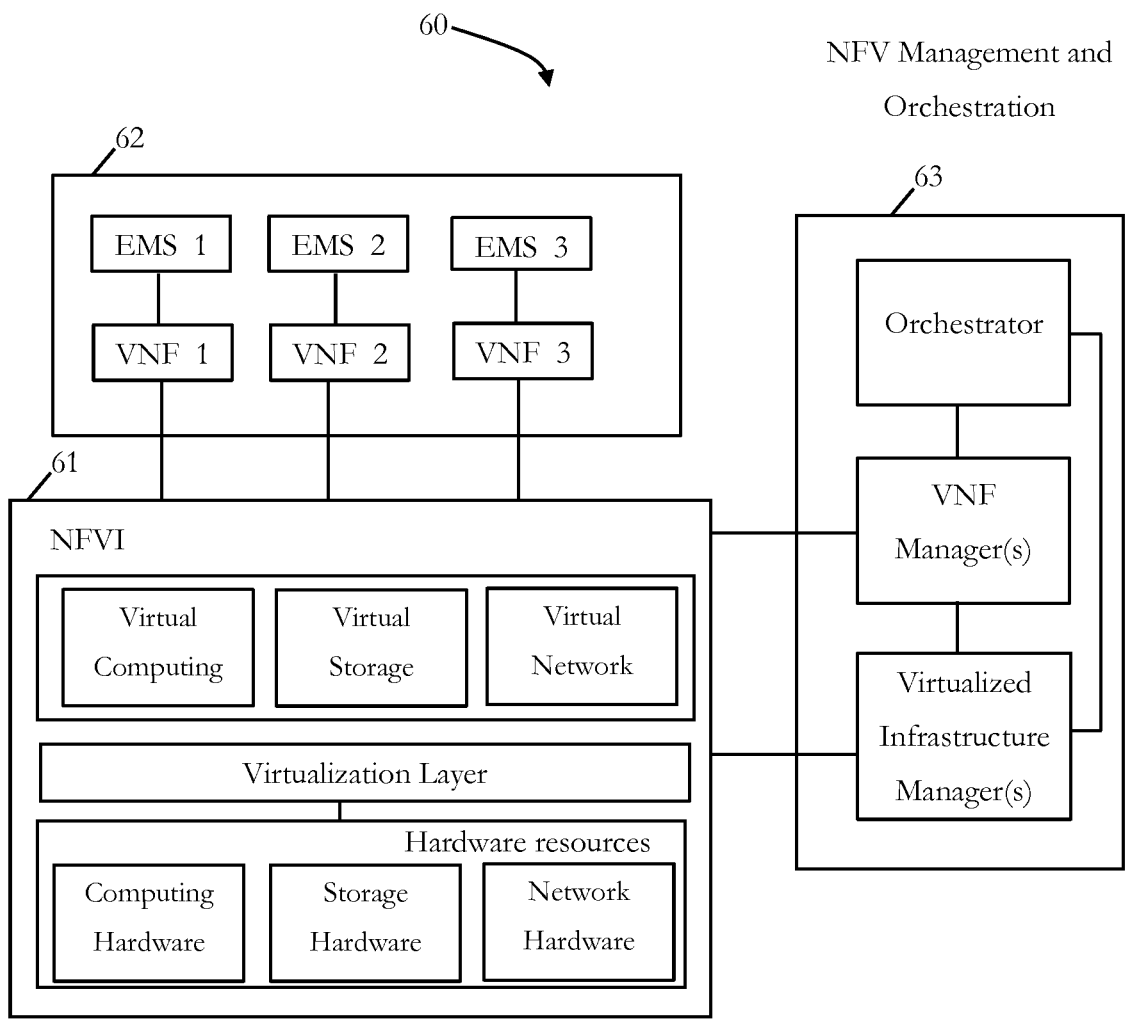
FIG. 8 illustrates an embodiment of a virtualization infrastructure.

FIG. 8 schematically illustrates such a network virtualized function infrastructure 60, which can be used for providing blockchain functions as discussed herein under a virtualized network.

The virtual infrastructure 60 has a network function virtualization infrastructure 61, which includes virtual computing, virtual storage and virtual network which is linked of a virtualization layer to hardware resource, e.g. computing hardware, storage hardware and network hardware.

Additionally, a virtual function block 62 is provided which includes virtual network functions (VNF) VNF 1, ..., VNF 3 and Elemental Management Systems (EMS) EMS 1, ..., EMS 3.

A virtual network function (VNF) is a general function in the network and provided for applications, such as core network protocol. The VNF is used for implementation of blockchain functions in some embodiments. This is a software running on the virtual machine or container. The Elemental Management Systems (EMS) is a management function of the VNF(s).

The infrastructure 60 also includes a NFV management and orchestration (MANO) block 63, which configures the VNF(s), which in turn handle the blockchain and the network for it (e.g. a virtual MESH network).

The telecom operator may offer the application interface (API) between the blockchain function and external functions for configuration, request, retrieving the result, etc.

Figure 9:
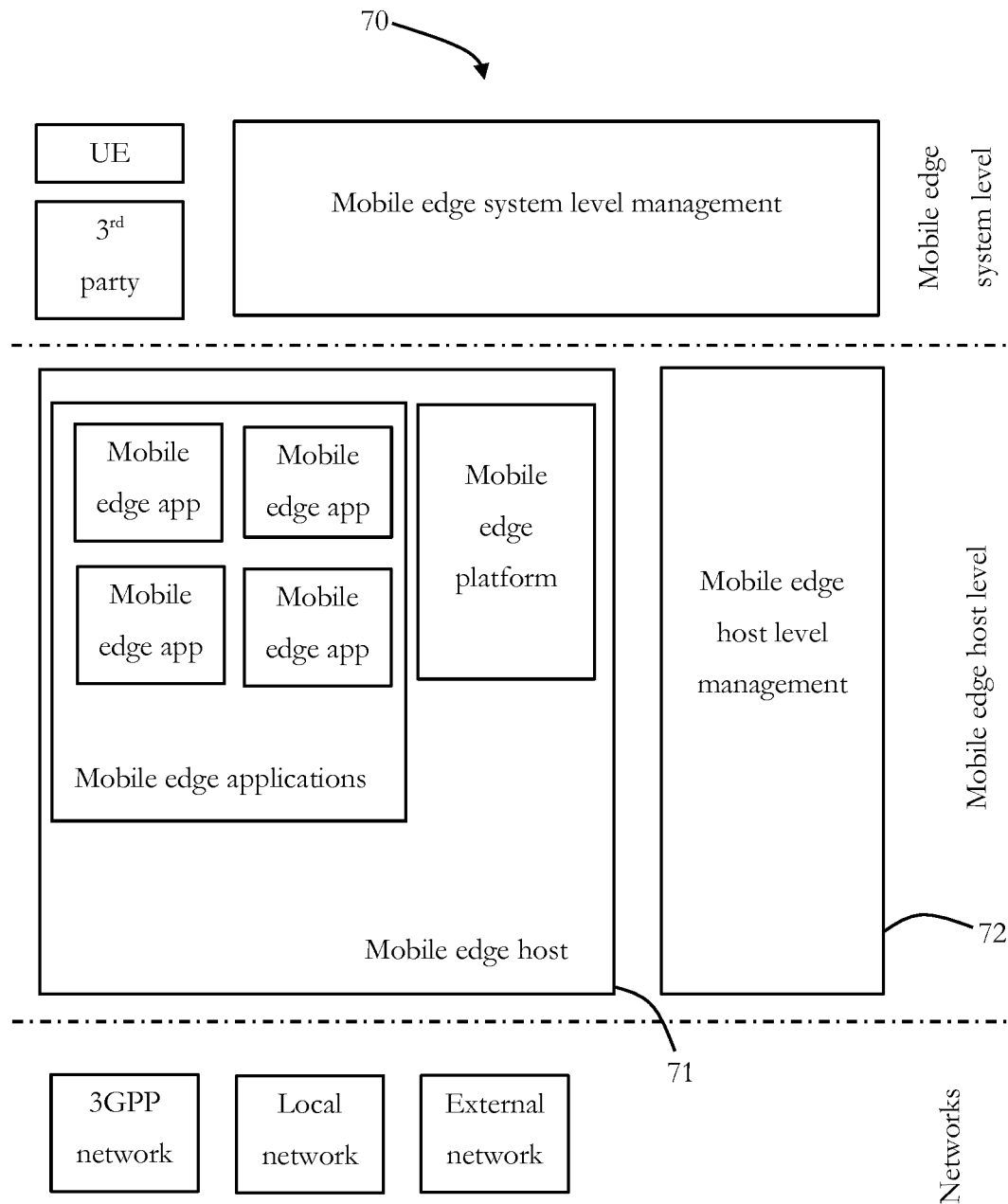
FIG. 9 illustrates an embodiment of mobile edge computing.

Another embodiment for providing the block chain function is based on mobile edge computing (MEC), as is explained under reference of FIG. 9 illustrating an ETSI mobile edge computing architecture 70 (see also ETSI GS MEC 003 V1.1.1 (2016 March), Mobile Edge computing (MEC); Framework and Reference Architecture).

The architecture 70 includes different networks, such as 3GPP network, local network and external networks. Above this layer in FIG. 9 the mobile edge host level is illustrated which includes a mobile edge host 71 which is managed by a mobile edge host level management 71.

The mobile edge host 71 has a virtualization infrastructure (NFVI), e.g. as this of FIG. 8, several mobile edge apps and a mobile edge platform, which are arranged over the NFVI in FIG. 9.

On top in FIG. 9, the mobile edge system level is illustrated in which the mobile edge system level management, UE and third party devises are located.

The blockchain function provided on the MEC 70 can be accessible from the Internet or telecom operator's network (e.g. SD-WAN, software defined wide area network).

Moreover, the blockchain is used for NFV networks, such as node authentication/immutable configuration log, etc.

Figure 10:
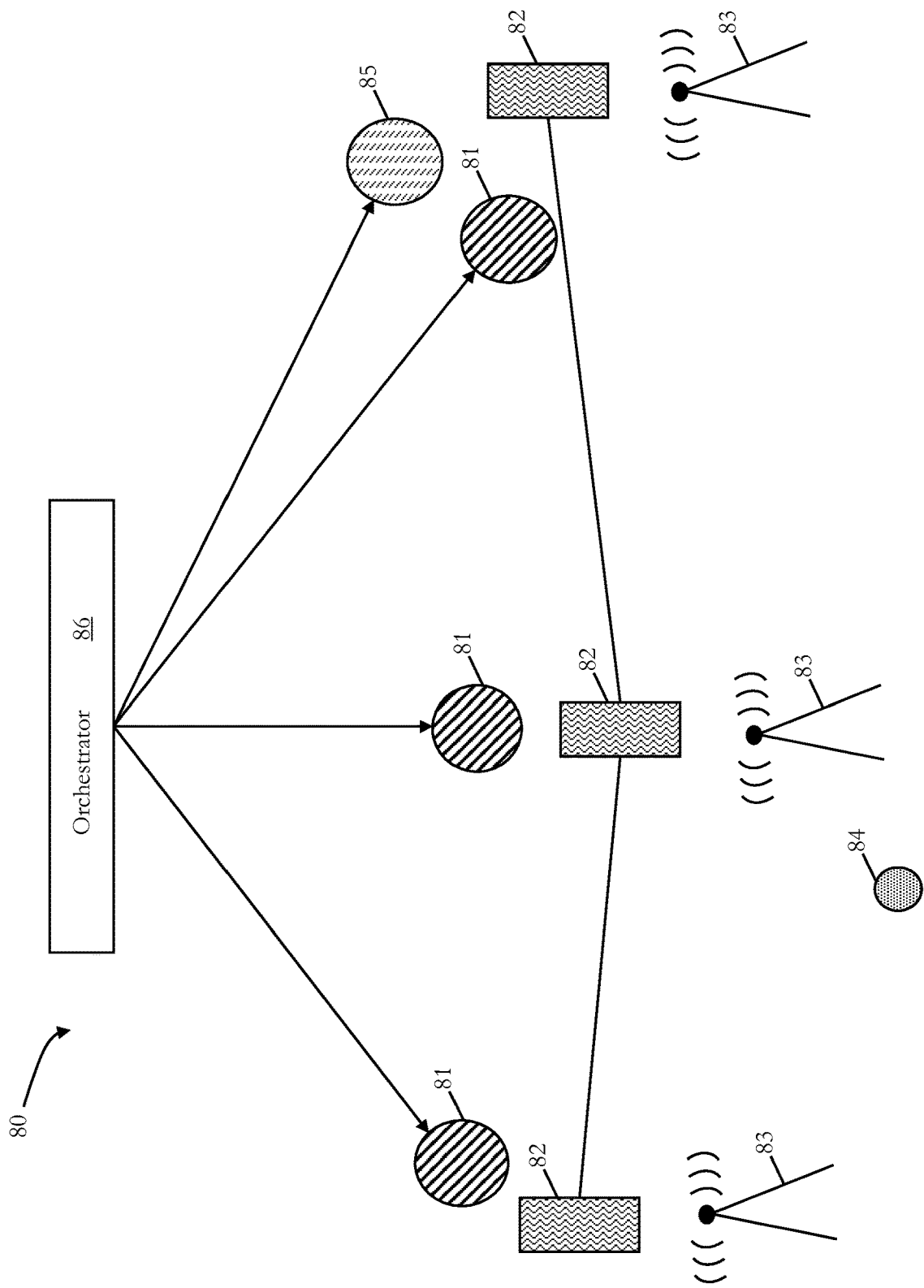
FIG. 10 illustrates an embodiment of a communication network providing a blockchain based on edge computing.

An embodiment of a communication network 80 for edge computing providing the blockchain functionality is illustrated in FIG. 10.

The network 80 provides several blockchain function instances 81 which are provided at mobile edge computing nodes 82, which are, in turn, located at base station access points 83. A user 84 accesses the network 80 over the access points 83.

Moreover, a user management instance 85 is provided, which is also located at an access point 82.

An overall orchestrator 86 manages the functions of the network 80.

A telecom operator may make a new instance on demand, such as conventional network functions provided by communication nodes in the network center or cloud. If the capacity of a node is tight, in conventional networks it is not easy to perform load balancing (move the process to other light load node) or auto-scaling (i.e. increase the process in line with demand).

In edge computing, and, thus, in the present network 80, the instance can be generate on demand by the orchestrator 86 and may move to other nodes, e.g. one of 82, if necessary. The physical location of process could be near to an end user, such as user 84. The communication between different nodes 82 can be low latency and reliable.

Therefore, the processing load of blockchain is less likely to be a bottleneck in the embodiment of network 80.

Hence, the virtual network and edge computing based blockchain may provide at least one of the following: Virtual direct links between nodes and flexible topology, such as mesh network, because of virtual network configuration/software defined network, processing power of nodes could be high because of the cloud based processing, and high security, due to processing by trusted nodes.

In some embodiments, a distributed ledger or blockchain is provided based on cloud computing as will explained in the following.

Figure 11:
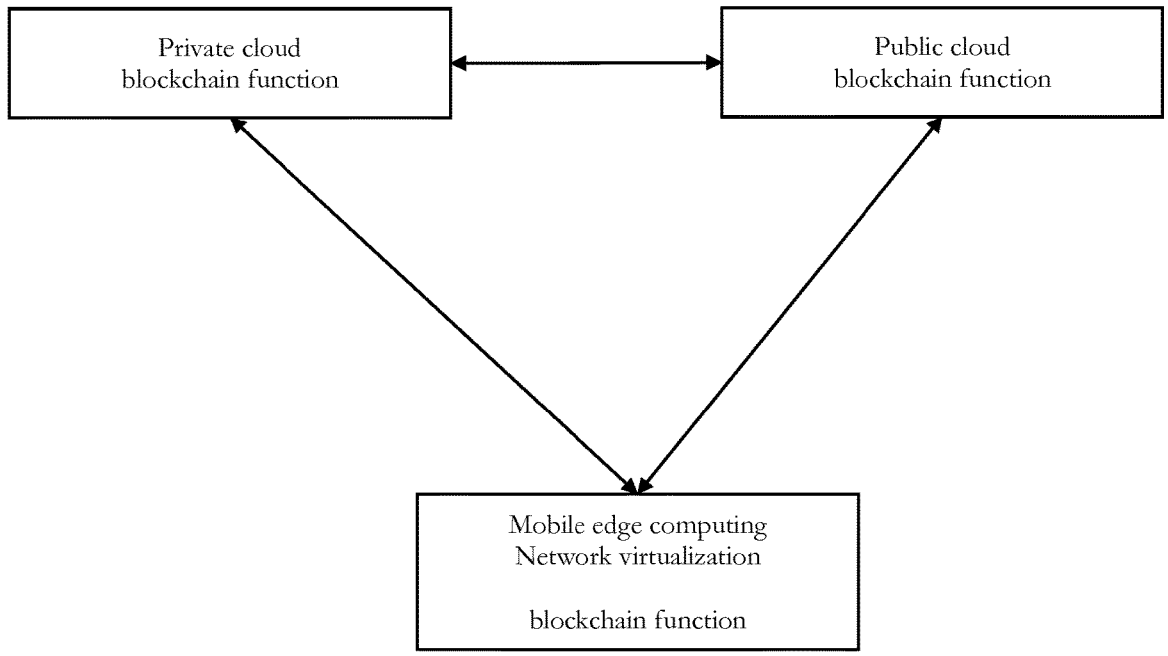
FIG. 11 illustrates an embodiment of blockchain processing in cloud computing.

Generally, various types of cloud computing are known, and FIG. 11 illustrates an example of cloud computing between different blockchains, wherein a public cloud, a private cloud and mobile edge computing cloud is provided, each being configured to provide a blockchain function. The clouds may communicate blockchains with each other and/or may have access to the different blockchains.

The mobile edge computing discussed above is able to provide fast processing capability in terms of CPU and network in some embodiments. However, it may not be suitable for keeping the distributed ledger for a long period due to storage limitation in some embodiments. In particular for MaaS embodiments, the data volume could be larger for MaaS journey records.

On the other hand, a pubic cloud is usually able to handle huge amount of data, large storage and also big data processing. Hence, in this embodiment, post processing of a distributed ledger can be handled by a public cloud. For example, when a mobility service provider or local government may need the statistics of transport, the blockchain could be handled on the public cloud.

The private cloud has high costs and limited capacity. However, it provides a high security and, thus, in this embodiments it is suitable for privacy sensitive data or critical data.

For example, the automotive industry may have the private cloud for autonomous driving or car sharing, fleet management and, thus, corresponding blockchains can be handled by the private cloud.

In some embodiments, a detailed access control of a blockchain is provided based on smart contracts. A smart contract is a software code attached to a blockchain and its specific software is executed if some predefined conditions are met.

The different types of clouds/different types of applications can access the blockchains in line with the conditions based on smart contract.

To the contrary, in a conventional central database, the data is just data and the administrator of database allocates the access right of the database for access control. But, in the present embodiment, the blockchain itself has this function (either of one of the clouds or in all clouds).

In the following, embodiments of revenue share concepts among mobility service providers are explained, which at least partially provide simple and accurate ways of revenue sharing and its calculation with distributed ledgers or blockchains.

Figure 12:
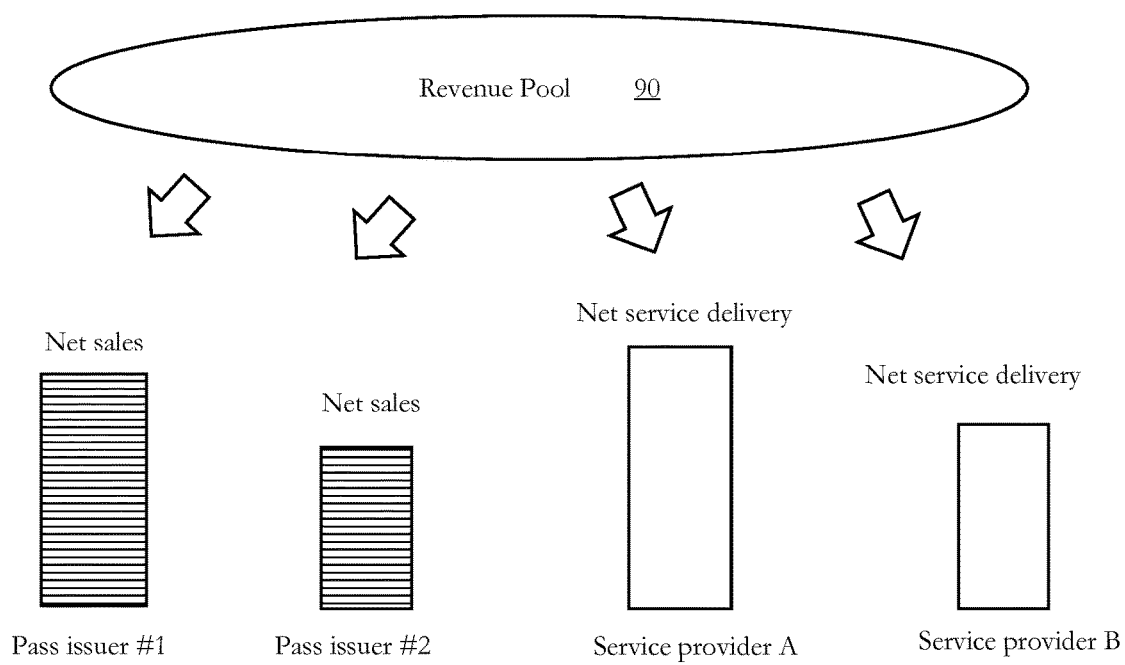
FIG. 12 illustrates an embodiment of revenue sharing.

A first embodiment of a method for sharing of revenues is illustrated in FIG. 12. Here, a revenue pool 90 is provided which collects revenues from multiple mobility service provides.

In this embodiment, net sales means the total income of ticket issuers for selling ticket or subscription for multi-operator mobility services.

Net service delivery means the total services provided by the operator. A large mobility service provider (e.g. railway company) may have or provide both selling ticket and providing the services to passenger, in that case, the difference between net sales and net service delivery is put into the revenue pool 90 if surplus or claimed if minus.

In FIG. 12, a first pass issuer #1 has a first amount of net sales and a second pass issuer #2 has a second (smaller) amount of net sales. Similarly, a first service provider A provides a first amount of net service delivery and a second service provider B provided a second (smaller) amount of net service delivery. As mentioned, the pass issuers and the service providers are mobility service providers in this embodiment.

In this embodiment, in a distributed ledger or blockchain the (total) sum of net sales among multiple ticket issuers is always the same as (or corresponds to) the (total) sum of net service delivery among multiple service providers, because the blockchains are common among the multiple players, e.g. all mobility service provides in a consortium, and each player uses the same content ledger for the calculation.

Figure 13:
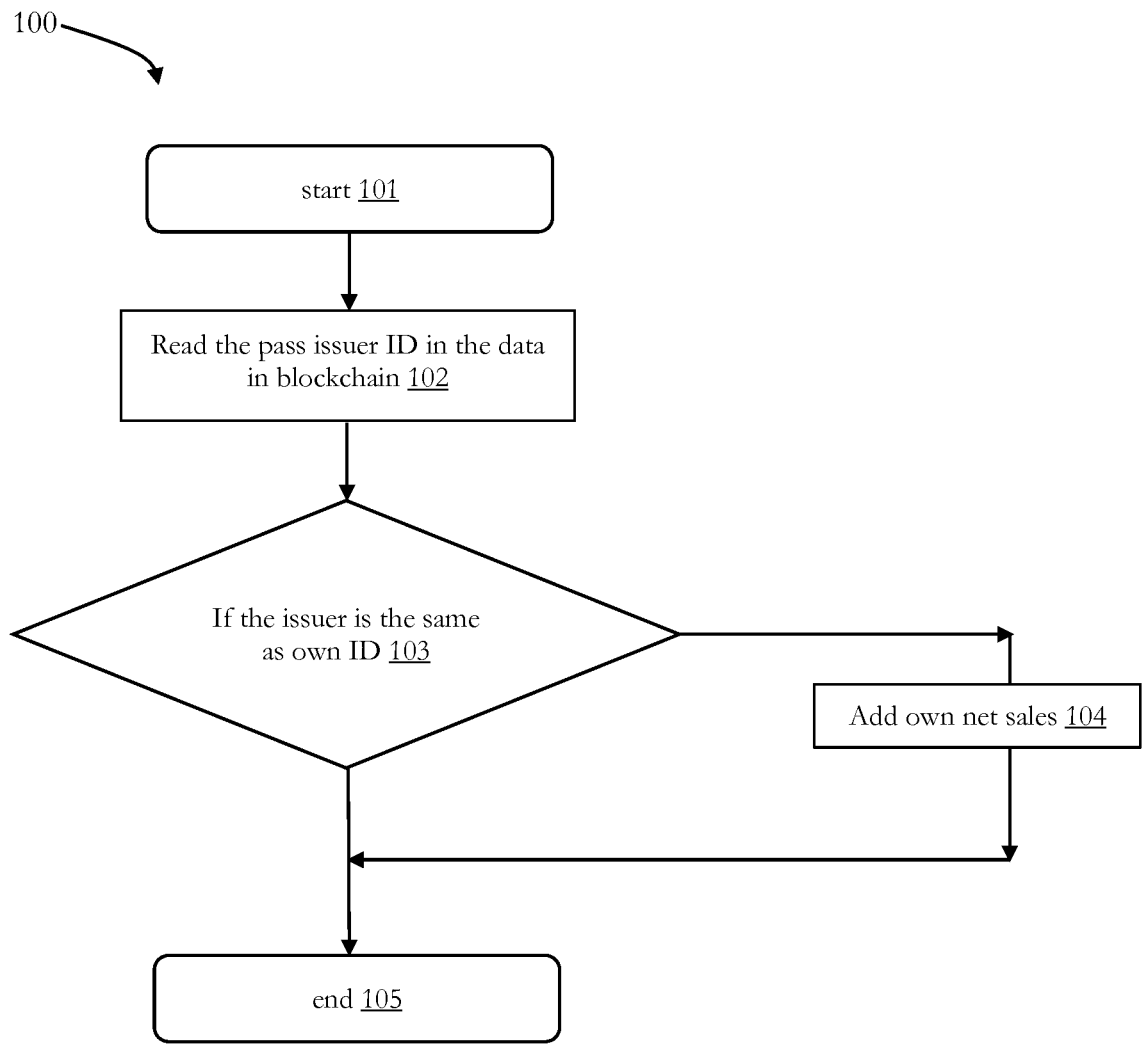
FIG. 13 illustrates an embodiment of a method for net sale calculation with a distributed ledger.

FIG. 13 illustrates a flowchart of a method 100 of net sales calculation. The method starts at 101.

At 102, each pass issuer reads the data in the blockchain (e.g. journey log data) and finds the pass issuer ID in it.

At 103, the pass issuer checks whether the found pass issuer ID is the same as the own ID, and, if this is the case, it adds the amount of ticket price to the net sales at 104, after that or if the ID is not the same, the method ends at 105.

For the net service delivery a similar method for calculation using the same principle is provided.

Figure 14:
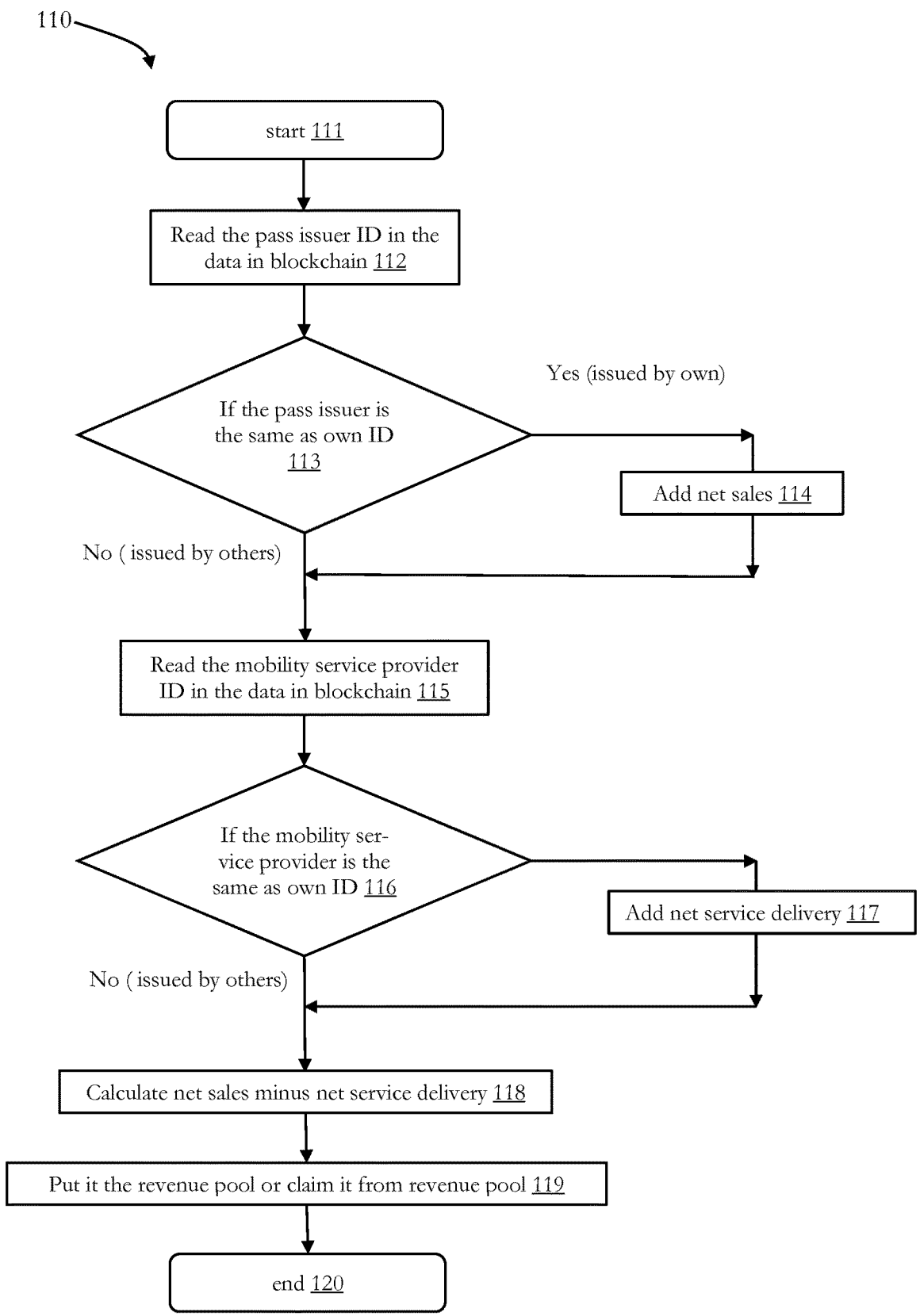
FIG. 14 illustrates an embodiment of a method for revenue share calculation with a distributed ledger.

A method 110 for revenue sharing for the operator which is in charge of both ticket issue and mobility service delivery is illustrated based on a flowchart in FIG. 14, wherein a service provider/transport operator (i.e. mobility service provider) calculates both the net sales and net service delivery with blockchains.

The method start at 111 and, as mentioned for FIG. 14, at 112 the pass issuer reads the pass issuer ID in the data in the blockchain, checks it at 113 and add it net sales at 114 as has been discussed for FIG. 13.

At 115, the mobility service provider reads the mobility service provider ID in the data in the blockchain and checks it with its own ID at 116. If the same ID is found, the net service delivery is added at 117, else the method forwards to 118.

At 118, the (total) net service delivery is subtracted from the (total) net sales.

At 119, if the net sales are larger than the service delivery by itself, the difference is added to the revenue pool, otherwise, i.e. in the opposite case, the difference is claimed to the revenue pool by the mobility service provider.

Figure 15:
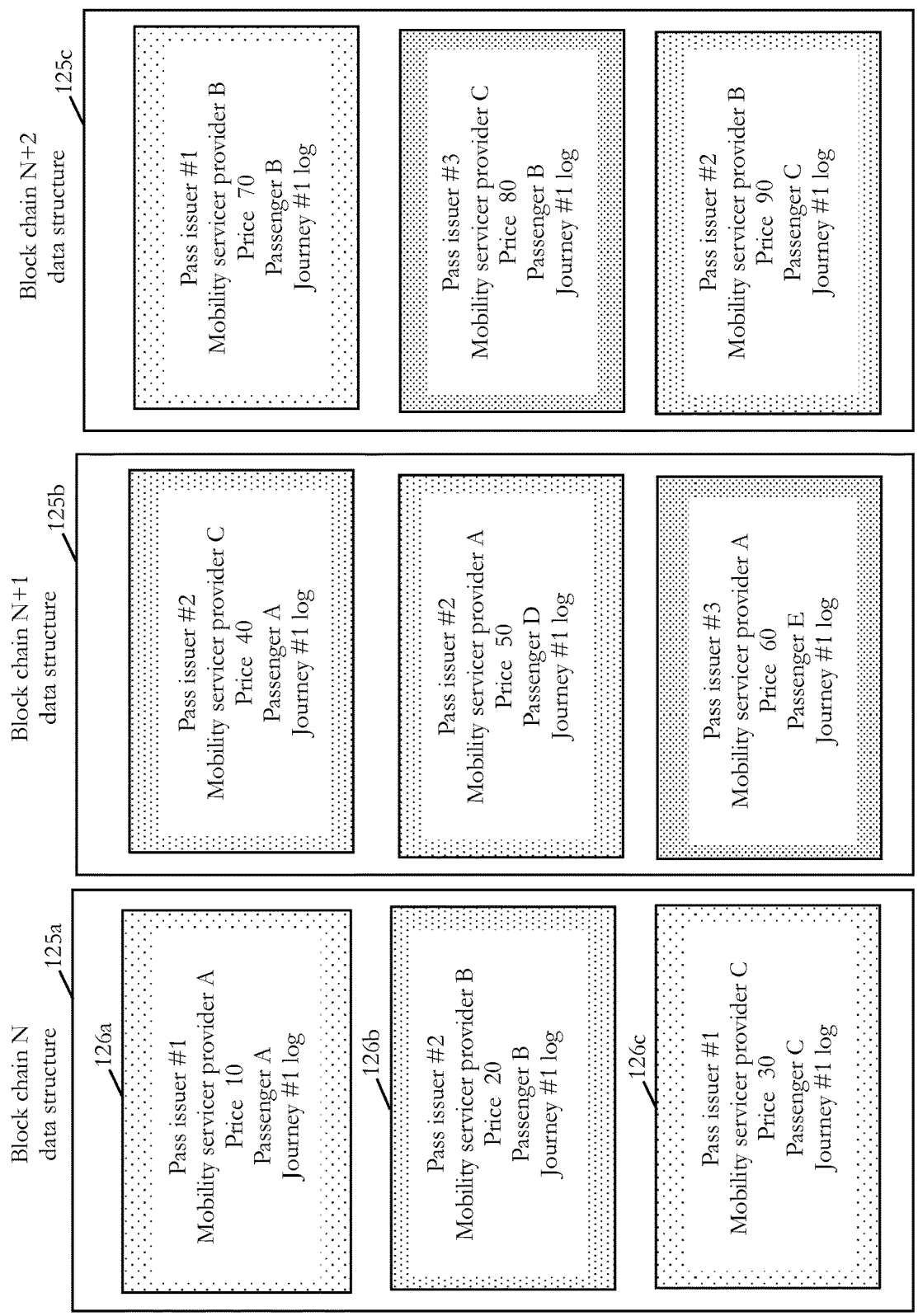
FIG. 15 illustrates an example of a data structure of a blockchain used in some embodiments.

FIG. 15 illustrates an example of a data structure in the blockchain in which the journey logs/data are stored, wherein in FIG. 15 three blocks 125*a*, 125*b* and 125*c* are shown (blocks N, N+1 and N+2). The dot density of different journey logs indicates same issuers (pass issuer #1, #2 or #3) of a multi-modal transport pass when the dot density is identical. The three blocks 125*a*, 125*b* and 126 are consecutive blocks.

The block 125*a* (#N) has three journey logs 126*a*, 126*b* and 126*c*, wherein the ticket of the first journey (126*a*) is issued by pass issuer #1 for a passenger A (mobility service provider A).

Then, the passenger A takes a transport provided by the mobility service provider A, wherein the price of this transport is 10 Euro.

Similarly, the ticket of a second journey in block 125*a* (#N) for a passenger B is issued by pass issuer #2, as can be taken from the second journey log 126*b* Then, the passenger B takes a transport provided by the mobility service provider B, wherein the price of this transport is 20 Euro.

The ticket of the third journey in block 125*a* (#N) is issued by pass issuer #1 for a passenger C, as can be taken from the third journey log 126*c*. Then, the passenger C takes a transport provided by the mobility service provider C, wherein the price of this transport is 30 Euro.

Figures 16, 17:
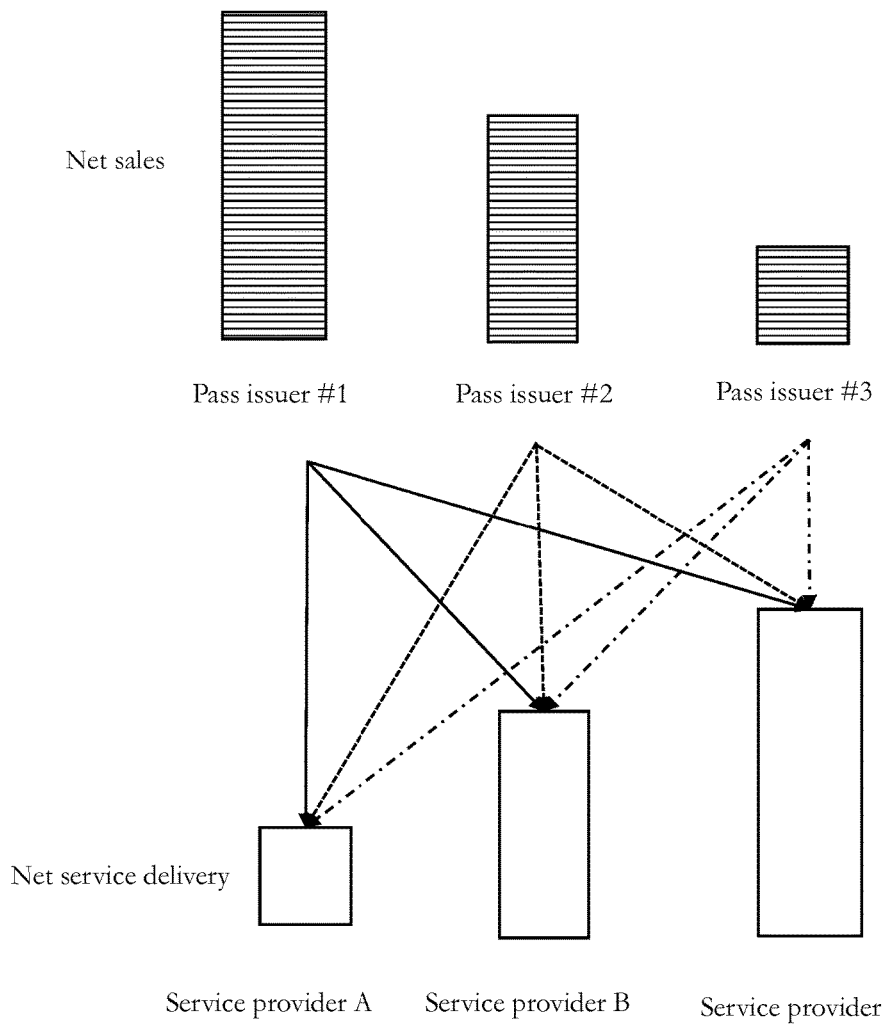
FIG. 16 illustrates a table for revenue share calculation.
FIG. 17 illustrates an embodiment of revenue providing.

Similarly, this chain continues in blocks 125*b* and 125*c*, as can be taken from FIGS. 15 and 16.

FIG. 16 illustrates a table showing the different sale and delivery costs/prices, which are provided by the different pass issuers and mobility service providers for the different blocks N, N+1, and N+2 and a total sale/delivery in the last column.

Referring to FIG. 16, the ticket of the first journey is issued by pass issuer #1 and it cost 10. Euros. Then, the passenger takes a transport provided by the mobility service provider A, wherein the price of this transport is 10 Euro.

This means that the pass issuer #1 owes mobility service provider A 10. Euro.

However, in some embodiments, it is not necessary to exchange the money between pass issuer #1 and mobility service provider A at this point (of time). To the contrary, the pass issuers #1 simply continues this process in block N+1 and block N+2, and, finally, the pass issuer #1 owes 110. Euros to other mobility service providers as can be taken from the last column of FIG. 16.

Other pass issuers #2 and #3 are also performing the same calculation, and, as a result, pass issuer #2 owes 200. Euro, and pass issuer #3 owes 140. Euro (see last column of FIG. 16), which is in total 450 Euros, such that in total 450 Euros are owed to the mobility service providers A, B and C. As can be taken from FIG. 16, for the mobility service provides a total claim for provided services is 450 also Euro, such that in total the amount of revenues which are owed and which can be claimed balance each other (the net sum is zero).

The pass issuer has to only care of the own part of net sales. A pass issuer does not need to care whether other pass issuers calculation/mobility service providers calculation is correct or not. The distributed ledger/blockchain is shared with the other pass issuers and mobility service providers, such that the whole information is accessible to all mobility service providers in the general sense (i.e. including pass issuers and mobility service providers of the present example).

In other words, the revenue/cost values on ledger/blockchain is always consistent.

From a pass issuer's point of view, they simply calculate the sum of the owed values to someone and then put into the revenue pool.

From a mobility service provider's point of view, they simply calculate the sum of own claim values. However, the mobility service provider provided the transport withdraws it from revenue pool.

Hence, using the blockchain/distributed ledger in that way provides a simple calculation of revenues, since in total the sum of net sales and the sum of net service delivery correspond to each other and balance out, as can also be taken from FIG. 16:

The sum of net sales by all the pass issuers: 110+200+140=450

The sum of service delivery by all the mobility service providers: 120+180+150=450

Thus, in some embodiments, by using blockchains a direct financial transaction between peers/nodes in the communication network is possible without the need of a central organization (i.e. bank).

However, the adjustment may not be simple compared to a known peer-to-peer transfer, and, thus, in the following embodiments are discussed which address the problem of who should pay to whom, and how much.

In principle, a surplus member(s) should transfer the money to a shortage member(s) for balancing. The following embodiments allow to reduce the number of transactions.

FIG. 17 illustrates an embodiment wherein the revenues are split into the share in proportion to the amount of service delivery.

In this embodiment, each net sales holder (pass issuers #1, #2 and #3 in upper side FIG. 17) transfers the revenues to all the holders of service delivery (service providers/transport operators A, B and C, lower side of FIG. 17).

Either each pass issuer transfers the revenue according to the shares to the claiming service providers or a service provider who claims the revenue shares the revenues according to the amount of service deliveries with the other service providers.

The pass issuer who has a surplus collects the broadcasted/transferred amount of service delivery(ies) and calculates the ratio of it (e.g. percentage).

Using the example numbers of the table of FIG. 16, if the amount of service delivery by A, B, C is 180, 150, and 120, then the ratio by A:B:C=180:150:120=40%:33.3%:27%.

Hence, if the pass issuer #2 has 200, he distributes the revenues according to the ratios, i.e. 200×0.4 to service provider A, 200×0.33 to service provider B, and 200×0.27 to service provider C=80, 66, and 54 Euros in this example.

However, the number of transactions may be large. For instance, if there are M pass issuers and N service providers, the number of transaction could be equal to the M×N combination.

Figure 18:
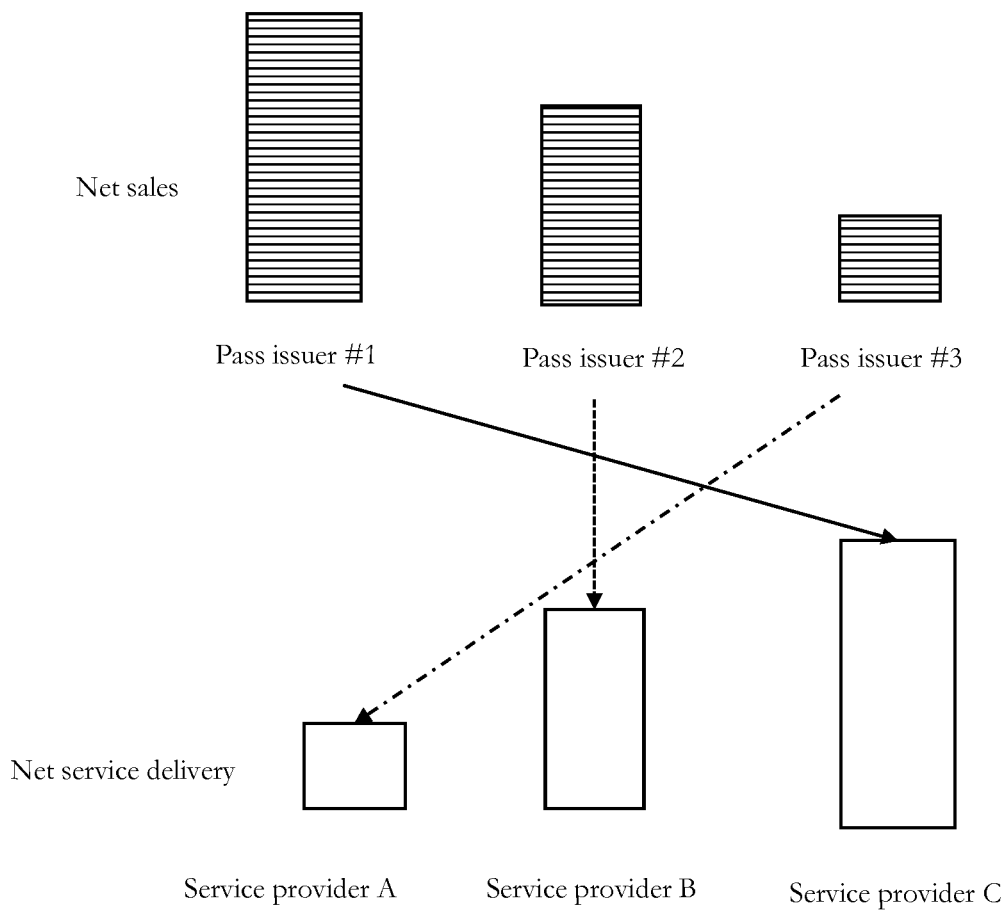
FIG. 18 illustrates an embodiment of revenue providing by balancing same amounts.

In another embodiment illustrated in FIG. 18, for the matching of the same amount is searched.

The most efficient way in terms of achieving a smaller number of transaction is to find the same amount of surplus peer and shortage peer. For this embodiment, it is assumed that the same amount of net sales and service deliveries is present in the consortium of mobility service providers (including service providers and pass issuers).

At first, each peer or node broadcasts the amount of surplus or shortage to other peers or nodes. A peer received the information finds the same amount of peers. If a good pair is luckily found, the surplus peer pays to the counterpart shortage peer, wherein both sides can be canceled out for just one transaction. In FIG. 18, this is illustrated for the net sales of pass issuer #1 corresponding to the net service deliveries of service provider C, etc. However, in practice, it might not be easy to find an exact same amount.

Hence, in some embodiments, this approach is tried at first and then it is changed to another method, such as that of FIG. 19, which will be explained in the following.

Figure 19:
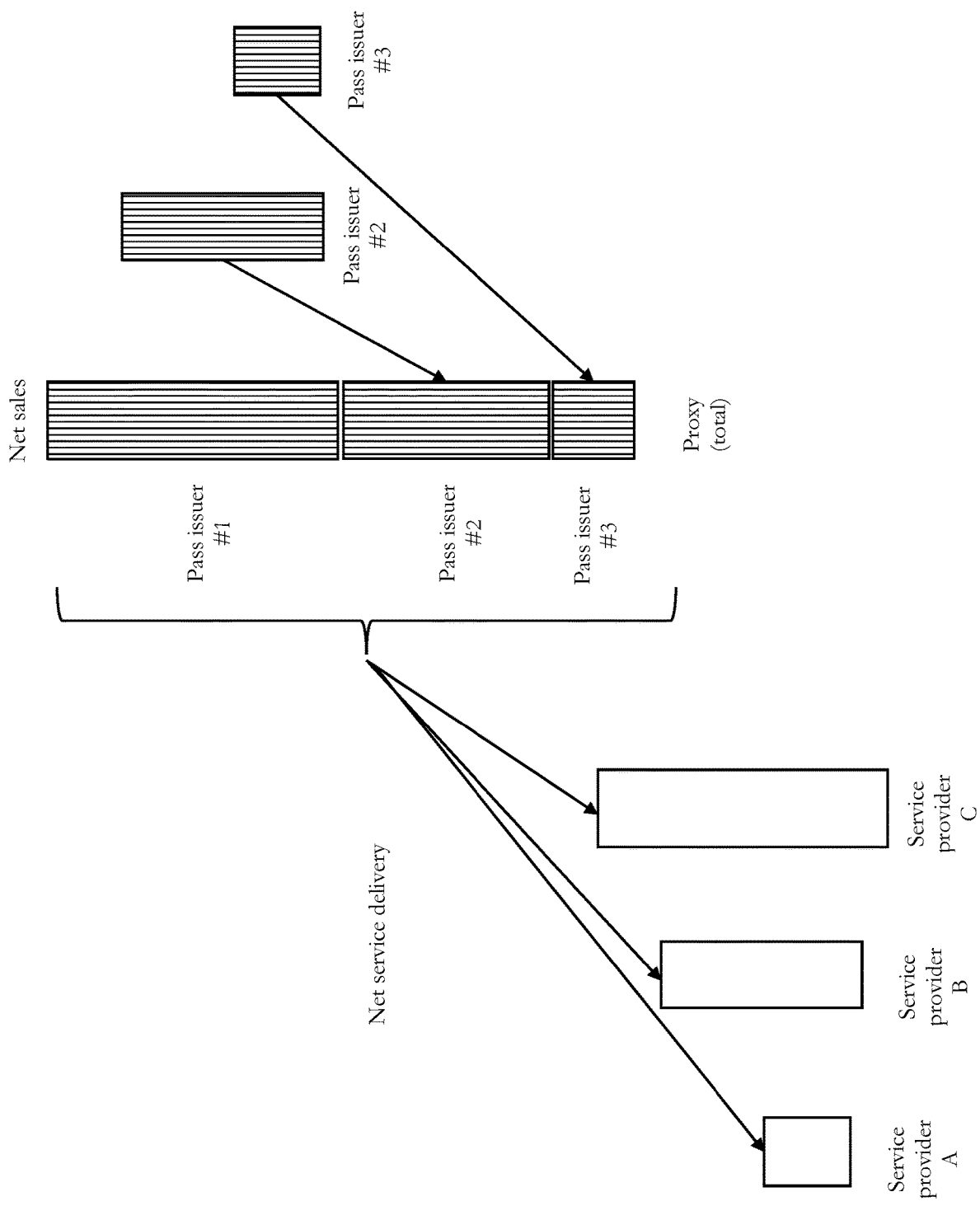
FIG. 19 illustrates an embodiment of revenue providing based on a proxy.

In FIG. 19, a proxy collects all net sales from all pass issuers and distributes the revenues to the service providers.

In some embodiments, the proxy is designated to the revenue pool.

The proxy collects all surplus from other surplus peers, such as pass issuers #1, #2 and #3 in FIG. 19.

The shortage peers, i.e. service providers A, B and C in FIG. 19, claim the own amount of shortage to the proxy peer.

In other embodiments, the proxy may be provided by a third party (e.g. bank server) or it may be decided among the peers. For example, the highest surplus peer becomes the proxy and collects others surplus and distributes it. However, in some embodiments, the proxy may be a bottleneck of the system.

Figure 20:
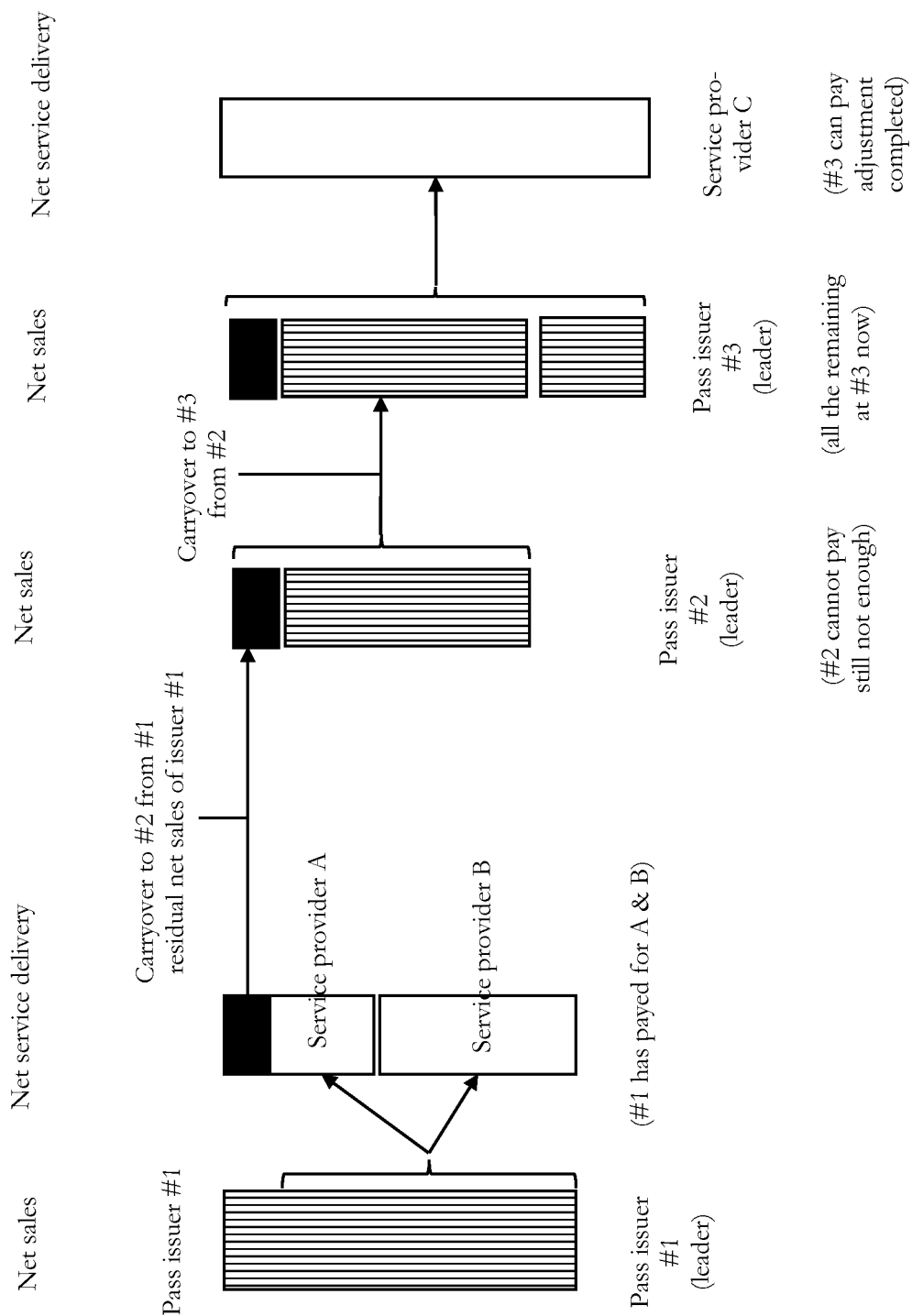
FIG. 20 illustrates an embodiment of revenue providing based on a proxy, wherein the proxy has a highest surplus.

FIG. 20 illustrates an embodiment with a modified proxy, wherein always a highest surplus peer becomes a leader, which is pass issuer #1 in FIG. 20, and pays to other shortage peers, i.e. service providers A and B in FIG. 20, wherein smaller amount of shortage peer first, and then cancels out. In FIG. 20, then pass issuer #2 becomes the leader and carries over to pass issuer #3 which becomes the next leader and which then pays to the remaining service provide C.

Hence, if it is impossible to pay in a one-shot transaction, the remaining amount transfers to the second highest surplus peer. Then, the second peer becomes the leader and pays to shortage peers. This process is iterated/repeated until the net sales and the net deliveries are balanced.

In some embodiments this above example is extended to international MaaS operation or MaaS operation in different regions. The blockchain is then defined as a multi-tier structure. The first tier blockchain is configured between countries or between regions and the second tier blockchain is configured in the consortium of the region. For example, a representative provider in regional consortium may join the first tier blockchains and handle the international services.

Summarizing, in some embodiment, a distributed ledger/blockchain provides consistency of a database among multiple entities without having the need of a central instance.

In conventional ways of revenue sharing, the service providers typically record the transaction at a central database and the main computer calculates the revenue share for each provider. Such a centralized system is typically complicated and involves high costs. It might be affordable to join it for a large mobility service provider like a railway company, but it may be too expensive for small providers, such as a bike sharing company to join. Distributed ledgers/blockchains can provide a decentralized and low cost system in some embodiments.

Another conventional way is that each service provider honestly claims the amount of service delivery to claim for the revenue share pool. However, it is difficult to validate the calculation if there is inconsistency of each service provider's calculation. It may be difficult for a service provider to cross check, because a provider unlikely keeps/shares other providers' databases. Even if the providers are honest, wrong input or a failure of machine could occur. This may also be a cause for inconsistency. Distributed ledgers/blockchains can provide robust and accurate database system in some embodiments.

Centralized server based MaaS, e.g. WO2018/042078A1, require that there is a common central server among transport operators for recording the journey history. There is a risk that the central server is down or a performance problem occurs, additionally to high costs of central server deployment.

Another conventional way is that each transport operator has its own database for own ticket issue. If the services are provided among the multiple MaaS operators, there is a risk of a database inconsistency between MaaS servers because the data are not shared with operators. It is not easy to validate others' database.

However, in some embodiments distributed ledger technology (DLT) with blockchains is implemented, which is a distributed database shared with multiple mobility service providers. In some embodiments, any member of the consortium can add/read block and share the same block among all consortium members. Hence, in principle, in some embodiments, the inconsistency of data among transport operators is impossible (immutable) because the output of a hash function does not match if there is an inconsistency in the data content of blockchains. Moreover, DLT intrinsically provides high availability, reliability and security in some embodiments.

Figure 21:
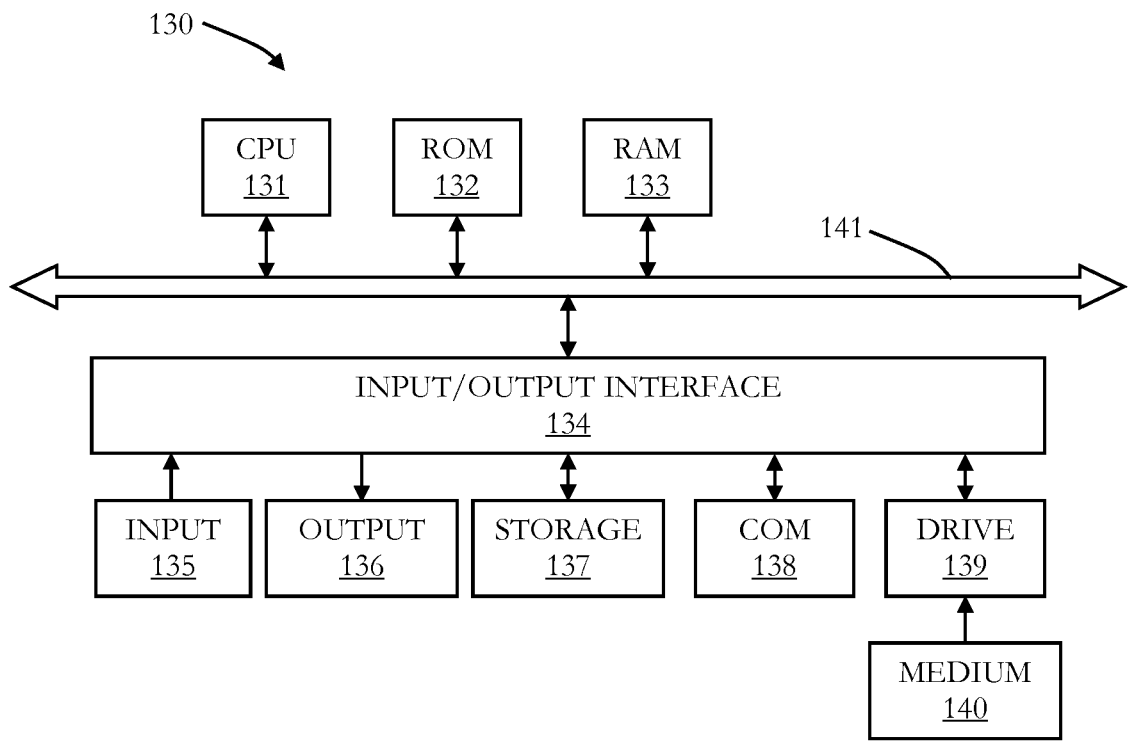
FIG. 21 illustrates an embodiment of a general-purpose computer on the basis of which a network equipment or a communication device is implemented in some embodiments.

In the following, an embodiment of a general purpose computer 130 is described under reference of FIG. 21. The computer 130 can be implemented such that it can basically function as any type of network equipment, e.g. a base station or new radio base station, transmission and reception point, or communication device, such as user equipment, (end) terminal device or the like as described herein. The computer has components 131 to 141, which can form a circuitry, such as any one of the circuitries of the network equipments and communication devices, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment (end terminal).

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

Figure 22:
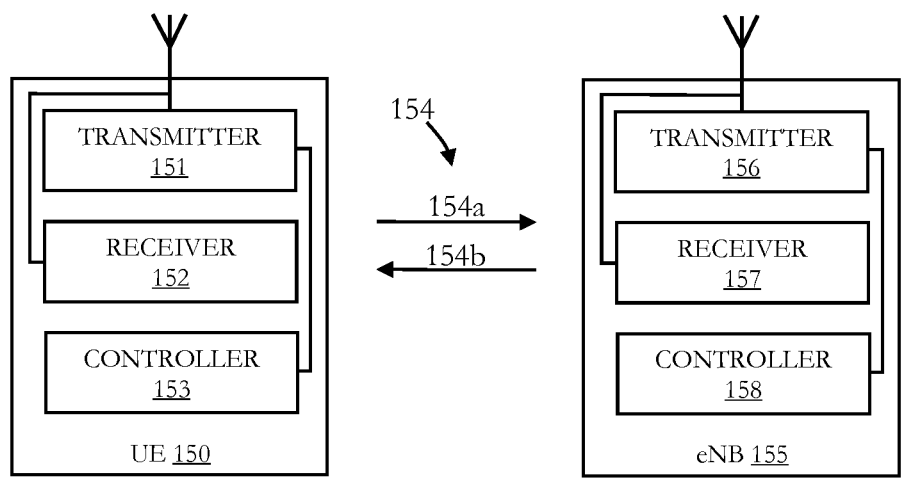
FIG. 22 illustrates an embodiment of an eNodeB and a user equipment communicating with each other.

An embodiment of an user equipment UE 150 and an eNB 155 (or NR eNB/gNB) and a communications path 154 between the UE 150 and the eNB 155, which are used for implementing embodiments of the present disclosure, is discussed under reference of FIG. 22. The UE 150 is an example of a communication device and the eNB is an example of a base station (i.e. a network equipment), without limiting the present disclosure in that regard.

The UE 150 has a transmitter 151, a receiver 152 and a controller 153, wherein, generally, the technical functionality of the transmitter 151, the receiver 152 and the controller 153 are known to the skilled person, and, thus, a more detailed description of them is omitted.

The eNB 155 has a transmitter 156, a receiver 157 and a controller 158, wherein also here, generally, the functionality of the transmitter 156, the receiver 157 and the controller 158 are known to the skilled person, and, thus, a more detailed description of them is omitted.

The communication path 154 has an uplink path 154a, which is from the UE 150 to the eNB 155, and a downlink path 154b, which is from the eNB 155 to the UE 150.

During operation, the controller 153 of the UE 150 controls the reception of downlink signals over the downlink path 154b at the receiver 152 and the controller 153 controls the transmission of uplink signals over the uplink path 154a via the transmitter 151.

Similarly, during operation, the controller 158 of the eNB 155 controls the transmission of downlink signals over the downlink path 154b over the transmitter 156 and the controller 158 controls the reception of uplink signals over the uplink path 154a at the receiver 157.

Further summarizing, as is apparent from the description, some embodiments pertain to a communication network for providing a distributed ledger, including at least one node configured to provide a distributed ledger function to other nodes.

The communication network may be configured as a telecommunication network, wherein the telecommunication network may be configured as a mobile telecommunication network. The at least one node may be an edge node of the telecommunication network, wherein the at least one node may provide an application programming interface and wherein the communication network may be further configured to provide the edge node on demand.

The distributed ledger function may be provided, based on a virtual network function. The communication network may further include an orchestrator for configuring the distributed ledger function. The virtual network function may be based on a virtual infrastructure.

The communication network may further include at least one further node, wherein the nodes are virtually linked to each other.

An access to the distributed ledger may be granted based on a smart contract.

The distributed ledger may include a blockchain.

The distributed ledger may include data for mobility as a service.

The other nodes to which the distributed function is provided may be part of a consortium, and the distributed ledger function may be provided based on a permission.

Some embodiments pertain to a method of providing mobility as a service, which may be implemented based on the communication network, the method including maintaining a distributed ledger on multiple nodes, wherein the distributed ledger includes journey data of users using the mobility as a service.

The distributed ledger may include a blockchain, wherein the blockchain may include multiple blocks, the block including the journey data.

The method may further include providing access to the distributed ledger, wherein the access to the distributed ledger may be granted based on a permission right.

The method may further include providing at least one of a user profile management function, passenger journey management function, and distributed ledger management function.

The user profile management function may include storing user information, wherein the user information may include at least one of name and birth of date of the user.

The user profile management function may include storying payment information, wherein the payment information may include at least one of credit card information and bank account information.

The user profile management function may include storing subscription information, wherein the subscription information may include at least one of subscribed service and pass information.

The passenger journey management function may include a book function for at least one of seat reservation, transport means sharing arrangement, transport means reservation.

The passenger journey management function may include transmitting journey data to the blockchain management function.

The passenger journey management function may include determining or storing a current status of a travel of a user.

The determining may include receiving information from a device of the user, wherein the device is an end-user terminal or a sensor.

The distributed ledger management function may include adding data to the distributed ledger or reading data from the distributed ledger.

The distributed ledger management function may include performing a consensus protocol, wherein the consensus protocol may be based on the Practical Byzantine Fault Tolerance.

The method may further include providing a revenue, wherein providing a revenue may include calculating an amount of revenue for a mobility service provider of the mobility as a service.

The amount of revenue may be calculated based on an amount of service delivery.

The amount of revenue may be balanced out by searching for another mobility service provider having a surplus corresponding to the amount of revenue.

The mobility service providers may be included in a consortium.

The amount of revenue may be provided from a revenue pool.

The method may further include collecting a surplus from the mobility service providers and providing it to the revenue pool.

The amount of revenue may be provided by a mobility service provider having the highest surplus.

The amount of revenue may be calculated based on a sum of net sales.

The sum of net may be associated with an identification (e.g. of the passenger, mobility service provider, etc.).

The amount of revenue may be calculated based on a sum of service deliveries.

The sum of service deliveries may be associated with a mobility service provider identification.

Some embodiments pertain to a network equipment, such as a base station, eNodeB or the like, which has a circuitry which is configured to maintain a distributed ledger on multiple nodes, wherein the distributed ledger includes journey data of users using the mobility as a service.

As discussed also above, the distributed ledger may include a blockchain, wherein the blockchain may include multiple blocks, the block including the journey data. The circuitry may be further configured to provide access to the distributed ledger. The access to the distributed ledger may be granted based on a permission right. The circuitry may be further configured to provide at least one of a user profile management function, passenger journey management function, and distributed ledger management function. The user profile management function may include storing user information. The user information may include at least one of name and birth of date of the user. The user profile management function may include storying payment information. The payment information may include at least one of credit card information and bank account information. The user profile management function may include storing subscription information. The subscription information may include at least one of subscribed service and pass information. The passenger journey management function may include a book function for at least one of seat reservation, transport means sharing arrangement, transport means reservation. The passenger journey management function may include transmitting journey data to the blockchain management function. The passenger journey management function may include determining or storing a current status of a travel of a user. The determining may include receiving information from a device of the user, wherein the device is an end-user terminal or a sensor. The distributed ledger management function may include adding data to the distributed ledger or reading data from the distributed ledger. The distributed ledger management function may include performing a consensus protocol. The consensus protocol may be based on the Practical Byzantine Fault Tolerance. The circuitry may be further configured to provide a revenue. The providing a revenue may include calculating an amount of revenue for a mobility service provider of the mobility as a service. The amount of revenue may be calculated based on an amount of service delivery. The amount of revenue may be balanced out by searching for another mobility service provider having a surplus corresponding to the amount of revenue. The mobility service providers may be included in a consortium. The amount of revenue may be provided from a revenue pool. The circuitry may be further configure to collect a surplus from the mobility service providers and providing it to the revenue pool. The amount of revenue may be provided by a mobility service provider having the highest surplus. The amount of revenue may be calculated based on a sum of net sales. The sum of net sales may be associated with an identification. The amount of revenue may be calculated based on a sum of service deliveries. The sum of service deliveries may be associated with a mobility service provider identification.

Some embodiments pertain to a communication device, such as a user equipment, an (end) terminal device or the like (e.g. mobile phone, smartphone, computer, laptop, notebook, etc.) which has circuitry configured to access a distributed ledger on multiple nodes, wherein the distributed ledger includes journey data of users using the mobility as a service.

As discussed above, the distributed ledger may include a blockchain, wherein the blockchain may include multiple blocks, the block including the journey data. The circuitry may be further configured to maintain the distributed ledger.

(82) The communication device of anyone of (78) to (81), wherein the access to the distributed ledger is granted based on a permission right. The circuitry may be further configured to provide at least one of a user profile management function, passenger journey management function, and distributed ledger management function. The user profile management function may include storing user information. The user information may include at least one of name and birth of date of the user. The user profile management function may include storying payment information. The payment information may include at least one of credit card information and bank account information. The user profile management function may include storing subscription information. The subscription information may include at least one of subscribed service and pass information. The passenger journey management function may include a book function for at least one of seat reservation, transport means sharing arrangement, transport means reservation. The passenger journey management function may include transmitting journey data to the blockchain management function. The passenger journey management function may include determining or storing a current status of a travel of a user. The determining may include receiving information from a device of the user, wherein the device is an end-user terminal or a sensor. The distributed ledger management function may include adding data to the distributed ledger or reading data from the distributed ledger. The distributed ledger management function may include performing a consensus protocol. The consensus protocol may be based on the Practical Byzantine Fault Tolerance. The circuitry may be further configured to provide a revenue. The providing a revenue may include calculating an amount of revenue for a mobility service provider of the mobility as a service. The amount of revenue may be calculated based on an amount of service delivery. The amount of revenue may be balanced out by searching for another mobility service provider having a surplus corresponding to the amount of revenue. The mobility service providers may be included in a consortium. The amount of revenue may be provided from a revenue pool. The circuitry may be further configured to collect a surplus from the mobility service providers and providing it to the revenue pool. The amount of revenue may be provided by a mobility service provider having the highest surplus. The amount of revenue may be calculated based on a sum of net sales. The sum of net sales may be associated with an identification. The amount of revenue may be calculated based on a sum of service deliveries. The sum of service deliveries may be associated with a mobility service provider identification.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A communication network for providing a distributed ledger, comprising at least one node configured to:
provide a distributed ledger function to other nodes.

(2) The communication network of (1), wherein the communication network is configured as a telecommunication network.

(3) The communication network of (2), wherein the telecommunication network is configured as a mobile telecommunication network.

(4) The communication network of (2) or (3), wherein the at least one node is an edge node of the telecommunication network.

(5) The communication network of (4), wherein the at least one node provides an application programming interface.

(6) The communication network of (4) or (5), wherein the communication network is further configured to provide the edge node on demand.

(7) The communication network of anyone of (1) to (6), wherein the distributed ledger function is provided, based on a virtual network function.

(8) The communication network of (7), further comprising an orchestrator for configuring the distributed ledger function.

(9) The communication network of (7) or (8), wherein the virtual network function is based on a virtual infrastructure.

(10) The communication network of anyone of (1) to (9), further comprising at least one further node, wherein the nodes are virtually linked to each other.

(11) The communication network of anyone of (1) to (10), wherein an access to the distributed ledger is granted based on a smart contract.

(12) The communication network of anyone of (1) to (11), wherein the distributed ledger includes a blockchain.

(13) The communication network of anyone of (1) to (12), wherein the distributed ledger includes data for mobility as a service.

(14) The communication network of anyone of (1) to (13), wherein the other nodes to which the distributed function is provided are part of a consortium.

(15) The communication network of (14), wherein the distributed ledger function is provided based on a permission.

(16) A method of providing mobility as a service, comprising:
maintaining a distributed ledger on multiple nodes, wherein the distributed ledger includes journey data of users using the mobility as a service.

(17) The method of (16), wherein the distributed ledger includes a blockchain.

(18) The method of (17), wherein the blockchain includes multiple blocks, the block including the journey data.

(19) The method of anyone of (16) to (18), further including providing access to the distributed ledger.

(20) The method of (19), wherein the access to the distributed ledger is granted based on a permission right.

(21) The method of anyone of (16) to (20), further comprising providing at least one of a user profile management function, passenger journey management function, and distributed ledger management function.

(22) The method of (21), wherein the user profile management function includes storing user information.

(23) The method of (22), wherein the user information includes at least one of name and birth of date of the user.

(24) The method of anyone of (21) to (23), wherein the user profile management function includes storying payment information.

(25) The method of (24), wherein the payment information includes at least one of credit card information and bank account information.

(26) The method of anyone of (21) to (25), wherein the user profile management function includes storing subscription information.

(27) The method of (26), wherein the subscription information includes at least one of subscribed service and pass information.

(28) The method of anyone of (21) to (27), wherein the passenger journey management function includes a book function for at least one of seat reservation, transport means sharing arrangement, transport means reservation.

(29) The method of anyone of (21) to (28), wherein the passenger journey management function includes transmitting journey data to the blockchain management function.

(30) The method of anyone of (21) to (29), wherein the passenger journey management function includes determining or storing a current status of a travel of a user.

(31) The method of anyone of (21) to (30), wherein the determining includes receiving information from a device of the user, wherein the device is an end-user terminal or a sensor.

(32) The method of anyone of (21) to (31), wherein the distributed ledger management function includes adding data to the distributed ledger or reading data from the distributed ledger.

(33) The method of anyone of (21) to (32), wherein the distributed ledger management function includes performing a consensus protocol.

(34) The method of (33), wherein the consensus protocol is based on the Practical Byzantine Fault Tolerance.

(35) The method of anyone of (16) to (34), further comprising providing a revenue.

(36) The method of (35), wherein providing a revenue includes calculating an amount of revenue for a mobility service provider of the mobility as a service.

(37) The method of (36), wherein the amount of revenue is calculated based on an amount of service delivery.

(38) The method of (36) or (37), wherein the amount of revenue is balanced out by searching for another mobility service provider having a surplus corresponding to the amount of revenue.

(39) The method of (38), wherein the mobility service providers are included in a consortium.

(40) The method of anyone of (36) to (39), wherein the amount of revenue is provided from a revenue pool.

(41) The method of (40), further comprising collecting a surplus from the mobility service providers and providing it to the revenue pool.

(42) The method of anyone of (36) to (41), wherein the amount of revenue is provided by a mobility service provider having the highest surplus.

(43) The method of anyone of (36) to (42), wherein the amount of revenue is calculated based on a sum of net sales.

(44) The method of (43), wherein the sum of net sales are associated with an identification.

(45) The method of anyone of (36) to (44), wherein the amount of revenue is calculated based on a sum of service deliveries.

(46) The method of (45), wherein the sum of service deliveries is associated with a mobility service provider identification.

(47) A network equipment comprising circuitry configured to:
maintain a distributed ledger on multiple nodes, wherein the distributed ledger includes journey data of users using the mobility as a service.

(48) The network equipment (47), wherein the distributed ledger includes a blockchain.

(49) The network equipment of (48), wherein the blockchain includes multiple blocks, the block including the journey data.

(50) The network equipment of (47) or (48), wherein the circuitry is further configured to provide access to the distributed ledger.

(51) The network equipment of (50), wherein the access to the distributed ledger is granted based on a permission right.

(52) The network equipment of anyone of (47) to (51), wherein the circuitry is further configured to provide at least one of a user profile management function, passenger journey management function, and distributed ledger management function.

(53) The network equipment of (52), wherein the user profile management function includes storing user information.

(54) The network equipment of (53), wherein the user information includes at least one of name and birth of date of the user.

(55) The network equipment of anyone of (52) to (54), wherein the user profile management function includes storying payment information.

(56) The network equipment of claim 55), wherein the payment information includes at least one of credit card information and bank account information.

(57) The network equipment of anyone of (52) to (56), wherein the user profile management function includes storing subscription information.

(58) The network equipment of (57), wherein the subscription information includes at least one of subscribed service and pass information.

(59) The network equipment of anyone of (52) to (58), wherein the passenger journey management function includes a book function for at least one of seat reservation, transport means sharing arrangement, transport means reservation.

(60) The network equipment of anyone of (52) to (59), wherein the passenger journey management function includes transmitting journey data to the blockchain management function.

(61) The network equipment of anyone of (52) to (60), wherein the passenger journey management function includes determining or storing a current status of a travel of a user.

(62) The network equipment of anyone of (52) to (61), wherein the determining includes receiving information from a device of the user, wherein the device is an end-user terminal or a sensor.

(63) The network equipment of anyone of (52) to (62), wherein the distributed ledger management function includes adding data to the distributed ledger or reading data from the distributed ledger.

(64) The network equipment of anyone of (52) to (63), wherein the distributed ledger management function includes performing a consensus protocol.

(65) The network equipment of (64), wherein the consensus protocol is based on the Practical Byzantine Fault Tolerance.

(66) The network equipment of anyone of (47) to (65), wherein the circuitry further configured to provide a revenue.

(67) The network equipment of (66), wherein providing a revenue includes calculating an amount of revenue for a mobility service provider of the mobility as a service.

(68) The network equipment of (67), wherein the amount of revenue is calculated based on an amount of service delivery.

(69) The network equipment of (67) or (68), wherein the amount of revenue is balanced out by searching for another mobility service provider having a surplus corresponding to the amount of revenue.

(70) The network equipment of (69), wherein the mobility service providers are included in a consortium.

(71) The network equipment of anyone of (67) to (69), wherein the amount of revenue is provided from a revenue pool.

(72) The network equipment of (71), wherein the circuitry is further configure to collect a surplus from the mobility service providers and providing it to the revenue pool.

(73) The network equipment of anyone of (67) to (72), wherein the amount of revenue is provided by a mobility service provider having the highest surplus.

(74) The network equipment of anyone of (67) to (73), wherein the amount of revenue is calculated based on a sum of net sales.

(75) The network equipment of (74), wherein the sum of net sales are associated with an identification.

(76) The network equipment of anyone of (67) to (75), wherein the amount of revenue is calculated based on a sum of service deliveries.

(77) The network equipment of (76), wherein the sum of service deliveries is associated with a mobility service provider identification.

(78) A communication device comprising circuitry configured to:
access a distributed ledger on multiple nodes, wherein the distributed ledger includes journey data of users using the mobility as a service.

(79) The communication device (78), wherein the distributed ledger includes a blockchain.

(80) The communication device of (79), wherein the blockchain includes multiple blocks, the block including the journey data.

(81) The communication device of anyone of (78) to (80), wherein the circuitry is further configured to maintain the distributed ledger.

(82) The communication device of anyone of (78) to (81), wherein the access to the distributed ledger is granted based on a permission right.

(83) The network equipment of anyone of (78) to (82), wherein the circuitry is further configured to provide at least one of a user profile management function, passenger journey management function, and distributed ledger management function.

(84) The communication device of (83), wherein the user profile management function includes storing user information.

(85) The communication device of (84), wherein the user information includes at least one of name and birth of date of the user.

(86) The communication device of (85), wherein the user profile management function includes storying payment information.

(87) The communication device of (86), wherein the payment information includes at least one of credit card information and bank account information.

(88) The communication device of anyone of (83) to (87), wherein the user profile management function includes storing subscription information.

(89) The communication device of (88), wherein the subscription information includes at least one of subscribed service and pass information.

(90) The communication device of anyone of (83) to (89), wherein the passenger journey management function includes a book function for at least one of seat reservation, transport means sharing arrangement, transport means reservation.

(91) The communication device of anyone of (83) to (90), wherein the passenger journey management function includes transmitting journey data to the blockchain management function.

(92) The communication device of (83) to (91), wherein the passenger journey management function includes determining or storing a current status of a travel of a user.

(93) The communication device of anyone of (83) to (92), wherein the determining includes receiving information from a device of the user, wherein the device is an end-user terminal or a sensor.

(94) The communication device of anyone of (83) to (93), wherein the distributed ledger management function includes adding data to the distributed ledger or reading data from the distributed ledger.

(95) The communication device of anyone of (83) to (94), wherein the distributed ledger management function includes performing a consensus protocol.

(96) The communication device of (95), wherein the consensus protocol is based on the Practical Byzantine Fault Tolerance.

(97) The communication device of anyone of (78) to (96), wherein the circuitry further configured to provide a revenue.

(98) The communication device of (97), wherein providing a revenue includes calculating an amount of revenue for a mobility service provider of the mobility as a service.

(99) The communication device of (98), wherein the amount of revenue is calculated based on an amount of service delivery.

(100) The communication device of (98) or (99), wherein the amount of revenue is balanced out by searching for another mobility service provider having a surplus corresponding to the amount of revenue.

(101) The communication device of (100), wherein the mobility service providers are included in a consortium.

(102) The communication device of anyone of (98) to (101), wherein the amount of revenue is provided from a revenue pool.

(103). The communication device of (102), wherein the circuitry is further configured to collect a surplus from the mobility service providers and providing it to the revenue pool.

(104) The communication device of anyone of (98) to (103), wherein the amount of revenue is provided by a mobility service provider having the highest surplus.

(105) The communication device of anyone of (98) to (104), wherein the amount of revenue is calculated based on a sum of net sales.

(106) The communication device of (105), wherein the sum of net sales are associated with an identification.

(107) The communication device of anyone of (98) to (106), wherein the amount of revenue is calculated based on a sum of service deliveries.

(108) The communication device of (107), wherein the sum of service deliveries is associated with a mobility service provider identification.

(109) A computer program comprising program code causing a computer to perform the method according to anyone of (16) to (46), when being carried out on a computer.

(110) A non-transitory computer-readable recording medium that stores therein a computer program product, which, when executed by a processor, causes the method according to anyone of (16) to (46) to be performed.

The invention claimed is:

1. A method of providing revenue sharing for mobility as a service, comprising:
maintaining a distributed ledger on multiple nodes, wherein the distributed ledger includes journey data of users using the mobility as a service, wherein the distributed ledger includes a blockchain, wherein the blockchain includes the journey data;
calculating both net sales and net service delivery based on the blockchain, wherein net sales and net service delivery are calculated by each service provider by reading journey data in the blockchain;
finding their own service provider ID;
adding a corresponding ticket price to their net sales total; and
adding a corresponding service price to their net service delivery total; and
determining revenue sharing for a service provider or a transport operator by subtracting the total net service delivery from the total net sales for each mobility service provider.

2. The method of claim 1, wherein the access to the distributed ledger is granted based on a permission right.

3. The method of claim 1, further comprising providing at least one of user profile management circuitry, passenger journey management circuitry, and distributed ledger management circuitry.

4. The method of claim 3, wherein the user profile management circuitry includes storing user information.

5. The method of claim 4, wherein the user information includes at least one of name and birth of date of the user.

6. The method of claim 3, wherein the user profile management circuitry includes storing payment information.

7. The method of claim 6, wherein the payment information includes at least one of credit card information and bank account information.

8. The method of claim 3, wherein the user profile management circuitry includes storing subscription information.

9. The method of claim 8, wherein the subscription information includes at least one of subscribed service and pass information.

10. The method of claim 3, wherein the passenger journey management circuitry includes a book function for at least one of seat reservation, transport means sharing arrangement, and transport means reservation.

11. The method of claim 3, wherein the passenger journey management circuitry includes transmitting journey data to the blockchain management circuitry.

12. A network equipment comprising circuitry configured to:
maintain a distributed ledger on multiple nodes, wherein the distributed ledger includes journey data of users using the mobility as a service, wherein the distributed ledger includes a blockchain, wherein the blockchain includes the journey data,
calculate both net sales and net service delivery based on the blockchain, wherein the circuitry for calculating both net sales and net service delivery for each service provider based on the blockchain is further configured to read journey data in the blockchain, find a service provider ID corresponding to the service provider, add a corresponding ticket price to a net sales total of the service provider, and add a corresponding service price to a net service delivery total of the service provider; and determine revenue sharing for a service provider or a transport operator by subtracting the total net service delivery from the total net sales for each mobility service provider.

13. A communication device comprising circuitry configured to:

access a distributed ledger on multiple nodes, wherein the distributed ledger includes journey data of users using the mobility as a service, maintain the distributed ledger, wherein the distributed ledger includes a blockchain, wherein the blockchain includes the journey data, calculate both net sales and net service delivery based on the blockchain, wherein the circuitry for calculating both net sales and net service delivery for each service provider based on the blockchain is further configured to read journey data in the blockchain, find a service provider ID corresponding to the service provider, add a corresponding ticket price to a net sales total of the service provider, and add a corresponding service price to a net service delivery total of the service provider; and determine revenue sharing for a service provider or a transport operator by subtracting the total net service delivery from the total net sales for each mobility service provider.

14. The communication device of claim 13, wherein the access to the distributed ledger is granted based on a permission right.

* * * * *